US008626570B2

(12) United States Patent
Lee et al.

(10) Patent No.: US 8,626,570 B2
(45) Date of Patent: Jan. 7, 2014

(54) METHOD AND SYSTEM FOR DATA QUALITY MANAGEMENT

(75) Inventors: Alvin Lee, Charlotte, NC (US); Donald E. Carlson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 2281 days.

(21) Appl. No.: 10/905,236

(22) Filed: Dec. 22, 2004

(65) Prior Publication Data

US 2006/0136461 A1 Jun. 22, 2006

(51) Int. Cl.
*G06Q 10/00* (2012.01)

(52) U.S. Cl.
USPC .................................. 705/7.41; 707/999.102

(58) Field of Classification Search
USPC .................................. 705/7.41; 707/999.102
See application file for complete search history.

(56) References Cited

U.S. PATENT DOCUMENTS

| | | | | |
|---|---|---|---|---|
| 5,602,761 | A * | 2/1997 | Spoerre et al. ............... | 702/179 |
| 5,907,490 | A * | 5/1999 | Oliver ............................ | 700/90 |
| 6,366,915 | B1 * | 4/2002 | Rubert et al. ................. | 707/770 |
| 6,505,145 | B1 * | 1/2003 | Bjornson ....................... | 702/185 |
| 6,671,715 | B1 * | 12/2003 | Langseth et al. .............. | 709/203 |
| 6,700,575 | B1 * | 3/2004 | Bovarnick et al. ............ | 345/440 |
| 6,701,259 | B2 * | 3/2004 | Dor et al. ....................... | 702/35 |
| 7,035,877 | B2 * | 4/2006 | Markham et al. .............. | 1/1 |
| 7,380,213 | B2 * | 5/2008 | Pokorny et al. ............... | 715/764 |
| 7,818,192 | B2 * | 10/2010 | Kymal et al. .................. | 705/7.38 |
| 7,848,947 | B1 * | 12/2010 | McGloin et al. .............. | 705/7.42 |
| 2001/0018643 | A1 * | 8/2001 | Brown ............................ | 703/6 |
| 2001/0052108 | A1 * | 12/2001 | Bowman-Amuah ............ | 717/1 |
| 2002/0052862 | A1 * | 5/2002 | Scott et al. ..................... | 707/1 |
| 2003/0014204 | A1 * | 1/2003 | Heslop et al. .................. | 702/84 |
| 2003/0088545 | A1 * | 5/2003 | Subramaniam et al. ........ | 707/3 |
| 2003/0188290 | A1 * | 10/2003 | Corral ............................ | 717/101 |
| 2004/0002961 | A1 * | 1/2004 | Dettinger et al. .............. | 707/3 |
| 2004/0138944 | A1 * | 7/2004 | Whitacre et al. .............. | 705/11 |
| 2005/0165748 | A1 * | 7/2005 | Ting et al. ...................... | 707/3 |
| 2005/0182739 | A1 * | 8/2005 | Dasu et al. ..................... | 706/47 |
| 2006/0061547 | A1 * | 3/2006 | Bramwell et al. ............ | 345/156 |

OTHER PUBLICATIONS

"Beyond project Controls—The Quality Improvement Approach", by Michael Sypsomos, AACE International Transactions; 1997.*
"TQM Principles and Tools Provide Structure for Process Improvement", by Richard A. Reid, University of New Mexico, Journal of Business & Entrepreneurship, vol. 11, No. 2, Oct. 1999.*
"Quality Control Expert Systems", by Tsuang Kuo and Anil Mital, Industrial Engineering, University of Cincinnati, Cincinnati, OH, Jul. 1992.*

(Continued)

*Primary Examiner* — Lynda Jasmin
*Assistant Examiner* — Pan Choy
(74) *Attorney, Agent, or Firm* — Michael A. Springs; Moore and Van Allen, PLLC; Patrick B. Horne

(57) ABSTRACT

A method for data quality management may include collecting data related to a project. The method may also include generating a predetermined representation of the data and implementing or performing an improvement related to the project in response to the representation of the data indicating a trend toward not meeting a predefined project goal. The method may further include defining a control plan in response to the data indicating a trend toward meeting the predefined project goal.

34 Claims, 32 Drawing Sheets

(56) References Cited

OTHER PUBLICATIONS

"Application of Statistical Process Control to Software Development Processes Via Control Charts", by Kamil Umut Sargut, The Middle East Technical University, May 2003.*

"A Corporate Strategy for the Control of Information Processing", by Henry C. Lucas, Jr. and Jon A. Turner, New York University, Sloan Management Review; Spring 1982; 23, 3; ProQuest Central, p. 25.*

"Managing Small Projects within a Utility", by Vincent Scatuccio, Jr., American Association of Cost Engineers, Transactions of the American Association, 1992; 2, ABI/INFORM Global, p. O.3.1-O.3.9.*

"Growing Total Quality into a Management Process", by George Cobbe, Business Quarterly; Spring 1993; 57, 3; ProQuest Central, p. 96.*

"Trend Detection in Control Data: Optimization and Interpretation of Trigg's Technique for Trend Analysis", by George S. Cembrowski et al., Departments of Medicine, Pathology, and the Clinical Laboratories, University of Wisconsin Center for Health Sciences, Presented in part at the 26th National Meeting of the AACC, Las Vegas, Nevada, Aug. 18.*

"Control Charts as a Tool in Data Quality Improvement", U.S. Department of Transportation, National Highway Traffic Safety Administration; NHTSA Technical Report, Dec. 1999.*

"Using Control Charts to Monitor Process and Product Quality Profiles", by William H. Woodall and Dan J. Spitzner, Virginia Tech, Blacksburg, Virginia; Douglas Montgomery and Shilpa Gupta, Arizona State University, Tempe, Arizona; vol. 36, No. 3; Jul. 2004.*

"Data Quality Assessment", by Leo L. Pipino et al., Communications of The ACM, Apr. 2002/vol. 45, No. 4ve.*

"Quantitative Quality Management through Defect Prediction and Statistical Process Control", by Pankaj Jalote et al., Addison Wesley Longman, Inc., Processes for Executing Software Projects at Infosys Technologies Ltd., 2000.*

"Application of Statistical Process Control to Software Development Processes Via Control Charts", by Kamil Umut Sargut, The Department of Information Systems, The Middle East Technical University, May 2003.*

"A Framework for Analysis of Data Quality Research", by Richard Y. Wang et al., IEEE Transactions on Knowledge and Data Engineering, vol. 7, No. 4, Aug. 1995.*

"Data Quality in the Database System Course", by Richard G. Mathieu and Omar Khalil, Data Quality Journal, vol. 4, No. 1, Sep. 1998.*

"Non-Intrusive Assessment of Organisational Data Quality", by Binling Jin and Suzanne M. Embury, Department of Computer Science, University of Manchester, UK; The 6th International Conference on Information Quality, 2002.*

"Application of Statistical Process Control to Software Development Processes Via Control Charts", The Middle East Technical University, May 2003.*

"Control Charts as a Tool in Data Quality Improvement", National Highway Traffic Safety Administration, U.S. Department of Transportation, DOT HS 809 005, Dec. 1999.*

"Quality Control Procedures for Weigh-in-Motion Data", by Andrew P. Nichols and Darcy M. Bullock, School of Civil Engineering, Purdue University, West Lafayette, IN 47907, Jun. 2004.*

"An Integrated Information System for Quality Management", by Alireza Lari, Business Process Management Journal; 2002; 8, 2; ProQuest Central, p. 169.*

Kamil Umut Sargut, Application of Statistical Process Control to Software Development Processes Via Control Charts, A Thesis Submitted to the Graduate School of Informatics of the Middle East Technical University, May 2003.

* cited by examiner

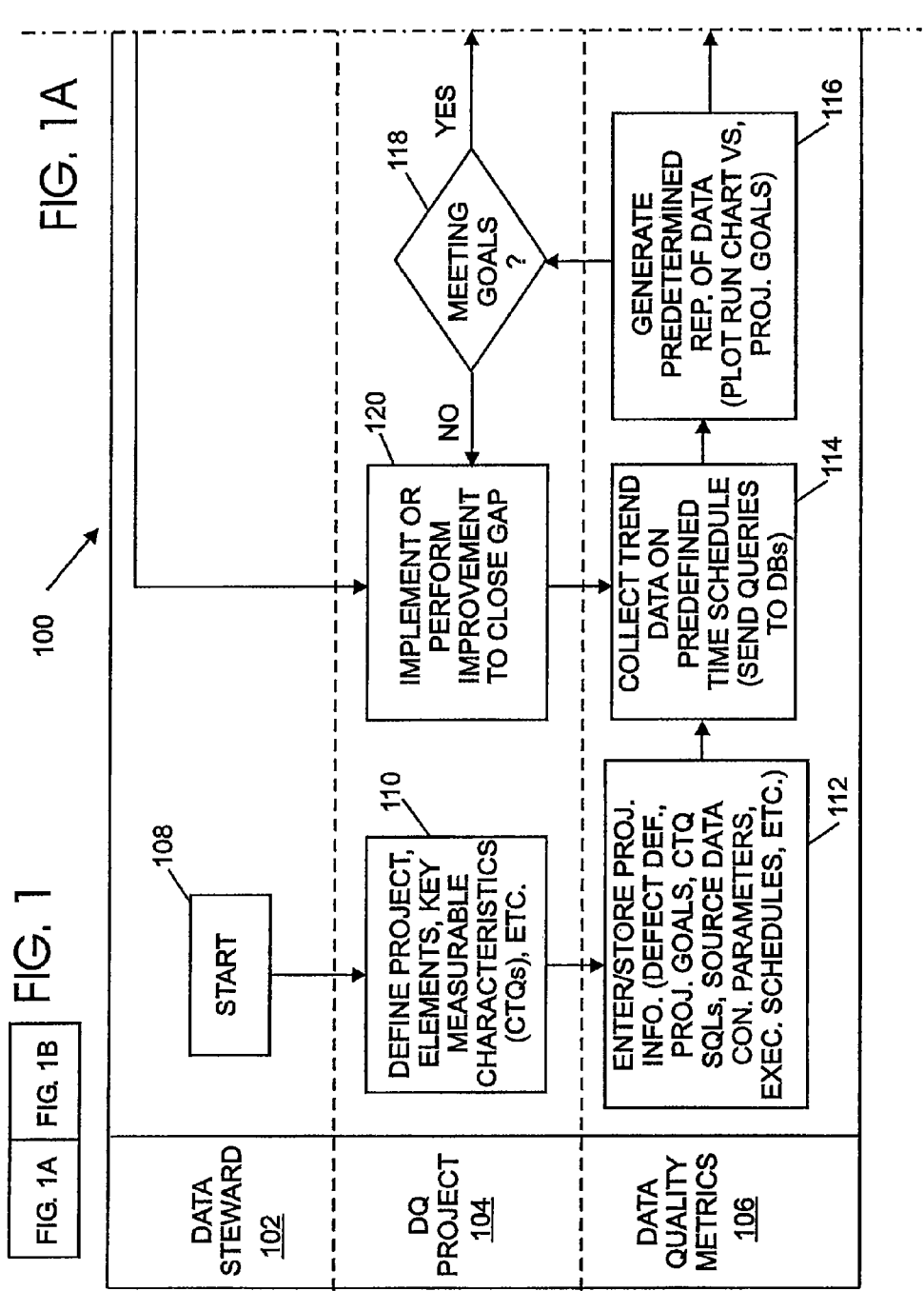

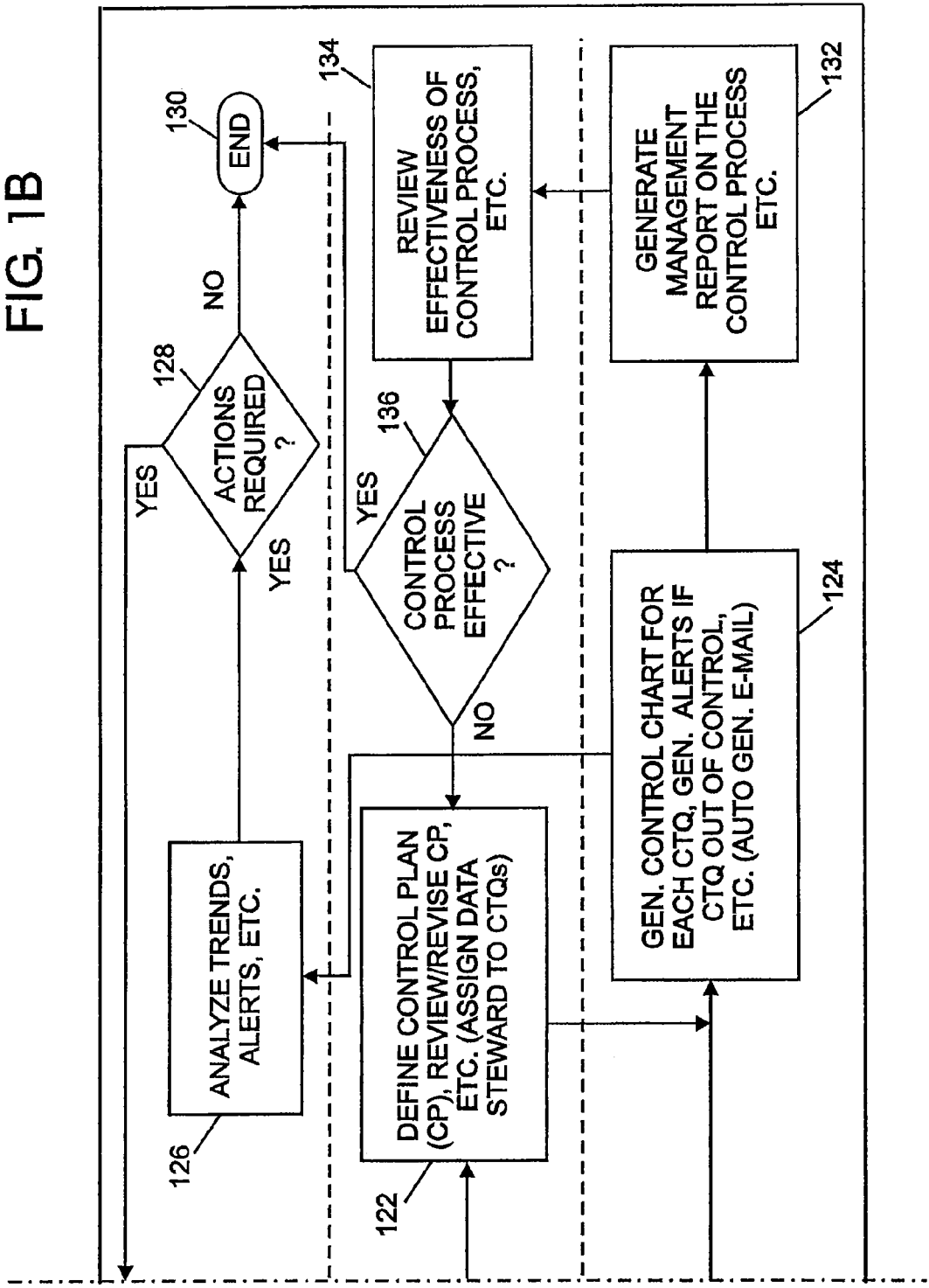

76 - Base Rate Plus/Minus Factor

| | May03 | Jun03 | Jul03 | Aug03 | Sep03 | Oct03 | Nov03 | Dec03 | Jan04 | Feb04 |
|---|---|---|---|---|---|---|---|---|---|---|
| Def# | 62,868 | 47,738 | 47,500 | 30,282 | 29,750 | 29,309 | 29,309 | – | – | – |
| Opp# | 1,227,591 | 1,229,537 | 1,226,940 | 1,227,122 | 1,224,559 | 1,220,390 | 1,220,390 | – | – | – |
| DPMO# | 51,212 | 38,826 | 38,714 | 24,677 | 24,294 | 24,016 | 24,016 | – | – | – |
| Target | 35,413 | 35,413 | 35,413 | 35,413 | 35,413 | 35,413 | 35,413 | 35,413 | – | – |
| Project | – | – | – | – | – | – | 24,016 | 24,016 | 24,016 | 24,016 |

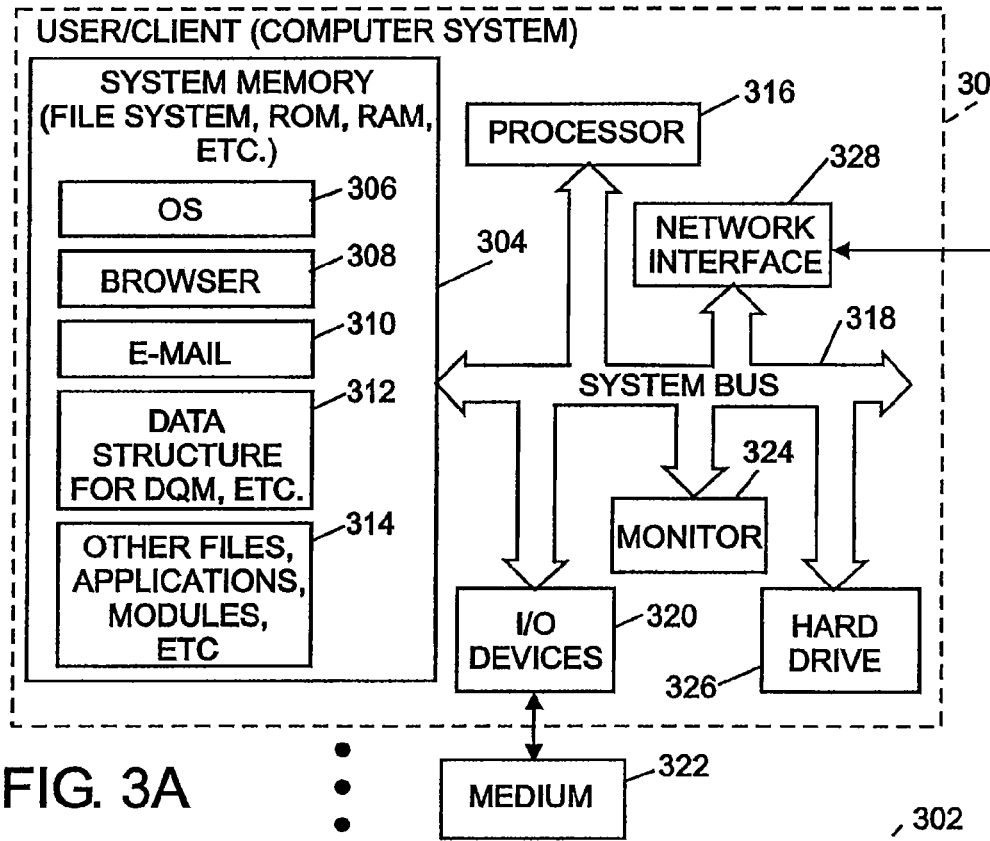
FIG. 3A
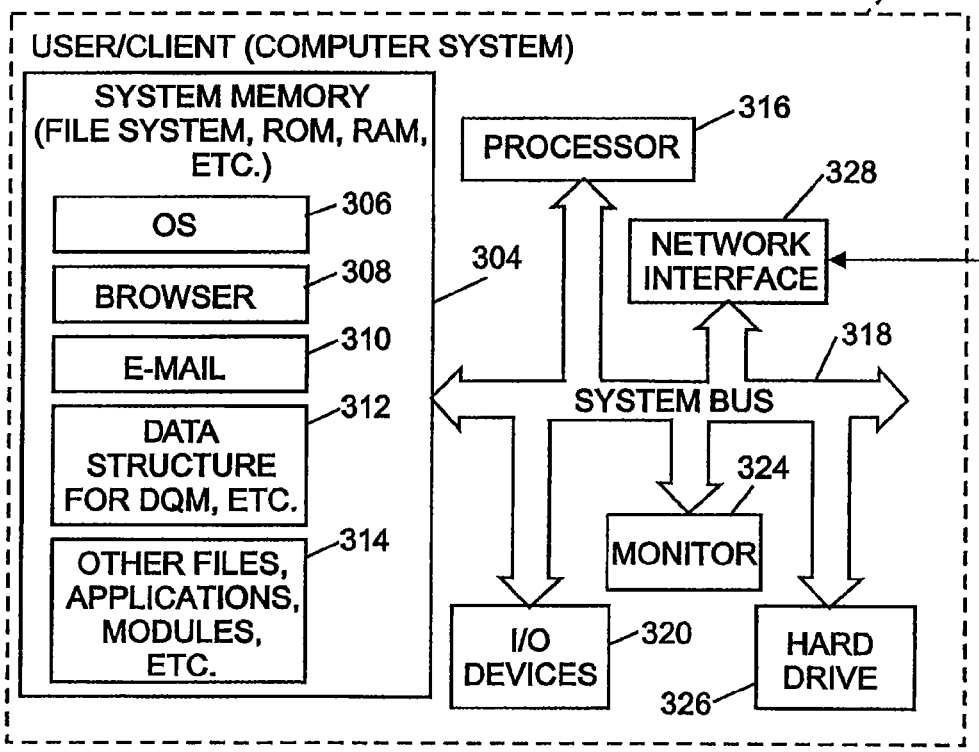

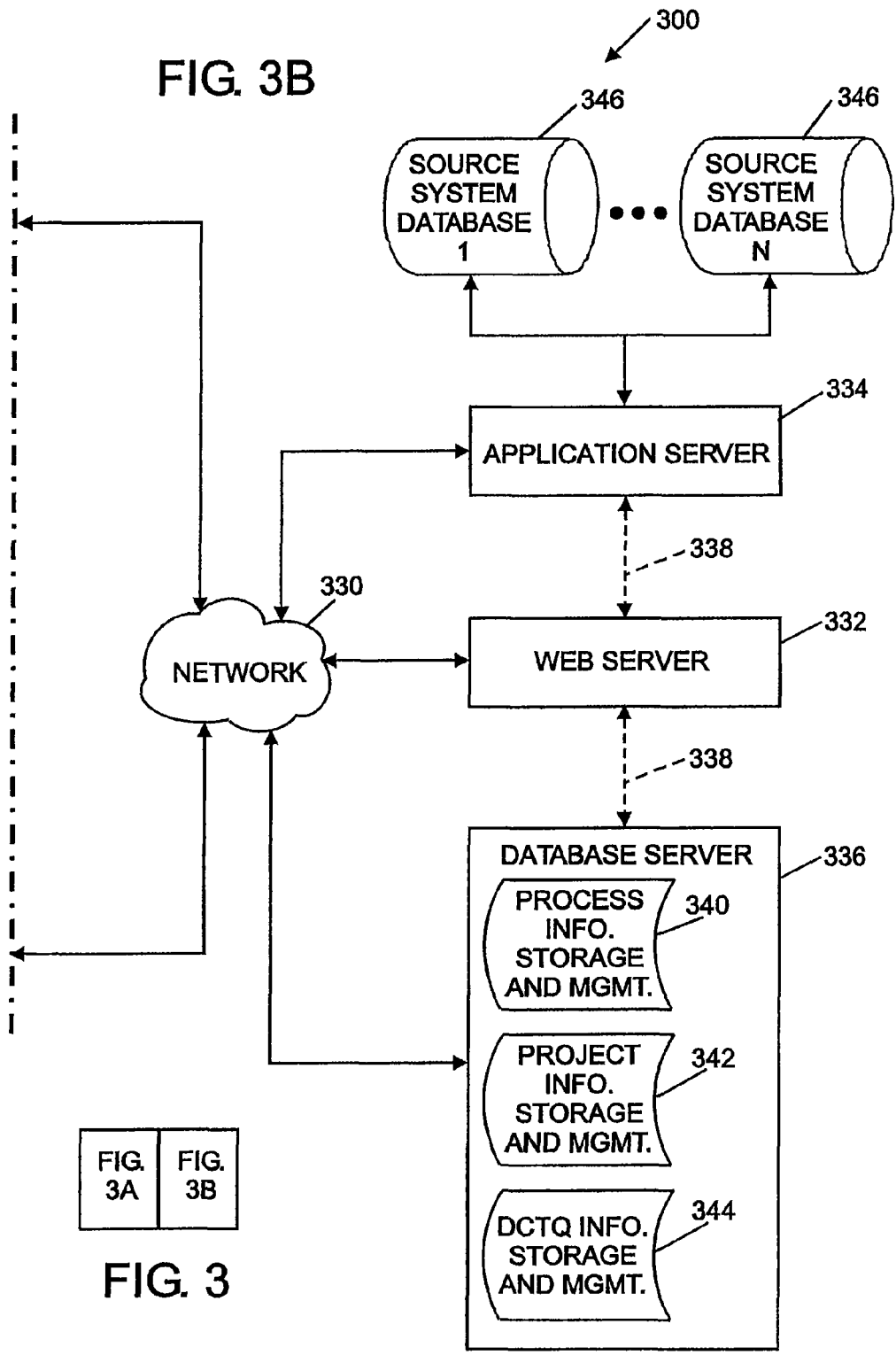

| 804 | 806 | 808 | 810 | 812 | 814 |
|---|---|---|---|---|---|
| Project | CTQ Perf. | CTQ Info | Project Goals | Alerts | MyProfile |

Program Overview

| | Program Title | Perf. | Apr04 |
|---|---|---|---|
| 816 | | | |
| 1854 | 2003 DQ Program - in CONTROL | DPM | 57,988 |
| | | Sigma | 2,991 |
| 818 2320 | 2004 DQ Program - CDQ Improvements | DPM | 20,980 |
| | | Sigma | 3,534 |
| 1237 | 2004 DQ Program - Improvements | DPM | 177,852 |
| | | Sigma | 2,423 |
| 1158 | Conversion DQ Process | DPM | 299 |
| 820 | | Sigma | 4,933 |

Project Overview   Check My Profile to add/remove projects.

| ☐ | Project Title | Perf. | Apr04 |
|---|---|---|---|
| 1854 | 2003 DQ Program - In CONTROL | | |
| ☐ 1530 | 2003 DQ MBF Project - In CONTROL | DPM | 66,966 |
| ☐ | | Sigma | 2,991 |
| 3095 | 2004 CDQ List B Project ◇ | DPM | — |
| ☐ | | Sigma | — |
| 2320 | 2004 DQ Program - CDQ Improvements | | |
| ☐ | | | |
| 2214 | 2004 CDQ List A Project | DPM | 20,980 |
| ☐ | | Sigma | 3,534 |
| 1257 | 2004 DQ Program - Improvements | | |
| ☐ | | | |
| 822  1596 | 2004 DQ MBF Project - Bryant | DPM | 235,470 |
| ☐ | | Sigma | 2,221 |
| 1597 | 2004 DQ MBF Project - Giroux | DPM | 72,288 |
| ☐ | | Sigma | 2,959 |
| 2259 | 2004 DQ MBF Project - In CONTROL | DPM | 3,701 | com/dqm/scripts/dqm/control_chart.pl?obj=pgm&id=2320

| | Project | CTQ Perf. | CTQ Info | Project Goals | | Alerts | |
|---|---|---|---|---|---|---|---|

Program Overview

| | Program Title | #oF Pjts | #oF CTQs | Active Query | With Steward | # of Stewards | Perf. |
|---|---|---|---|---|---|---|---|
| 1854 | 2003 DQ Program - in CONTROL | 1 | 53 | 51 | 53 | 6 | DPM Sigma |
| 2320 | 2004 DQ Program - CDQ Improvements | 1 | 22 | 21 | 22 | 1 | DPM Sigma |
| 1257 | 2004 DQ Program - Improvements | 6 | 101 | 87 | 101 | 14 | DPM Sigma |
| 1156 | Conversion DQ Process | 2 | 19 | 19 | 19 | 4 | DPM Sigma |

Project Overview Check _My Profile_ to add/remove projects

| | Project Title | #of CTQs | Active Query | With Steward | # of Stewards | Perf. |
|---|---|---|---|---|---|---|
| ☐ 1854 | 2003 DQ Program -In CONTROL | 0 | 0 | 0 | 0 | |
| ☐ 1530 | 2003 DQ MBF Project - in CONTROL | 53 | 51 | 53 | 6 | DPM Sigma |
| ☐ 3095 | 2004 CDQ List B Project ◇ | 6 | 2 | 6 | 1 | DPM Sigma |
| ☐ 2320 | 2004 DQ Program CDQ Improvements | 0 | 0 | 0 | 0 | |
| ☐ 2214 | 2004 CDQ List A Project | 22 | 21 | 22 | 1 | DPM Sigma |
| ☐ 1257 | 2004 DQ List Program - Improvements | 0 | 0 | 0 | 0 | |
| ☐ 1596 | 2003 DQ MBF Project - Bryant | 62 | 60 | 62 | 4 | DPM Sigma |
| ☐ 1597 | 2004 DQ MBF Project - Giroux | 15 | 3 | 15 | 6 | DPM Sigma |

| FIG. 11A | |
|---|---|
| FIG. 11B | FIG. 11C |
| FIG. 11D | FIG. 11E |

FIG. 11A

Individual and Moving R Charts

Project: 1692 - Amount Above Available per Transaction

| | Mar03 | Apr03 | May03 | Jun03 | Jul03 | Aug03 | Sep03 | Oct03 | Nov03 | |
|---|---|---|---|---|---|---|---|---|---|---|
| 7 | 1,035,151 | 1,203,772 | 1,045,375 | 1,057,605 | 1,295,495 | 1,160,721 | 1,332,764 | 1,502,701 | 1,335,270 | |
| 9 | 34,609 | 34,873 | 34,314 | 34,314 | 30,433 | 30,708 | 40,682 | 45,003 | 41,045 | |
| 2 | 34,419,671 | 30,996,677 | 30,485,000 | 30,949,956 | 32,114,756 | 32,410,404 | 32,757,397 | 30,391,129 | 37,552,011 | |
| 3 | — | — | — | — | — | — | — | — | — | |

Control Chart (I-MR)
P-Chart  U-Chart

Individuals Chart

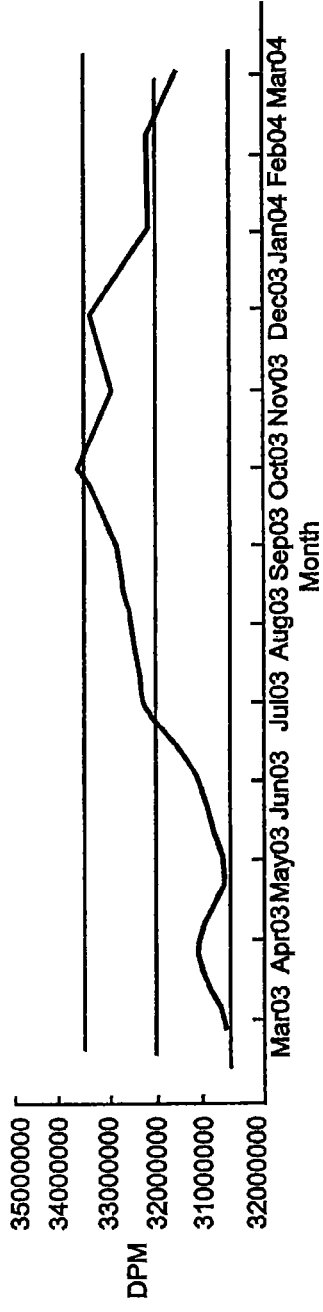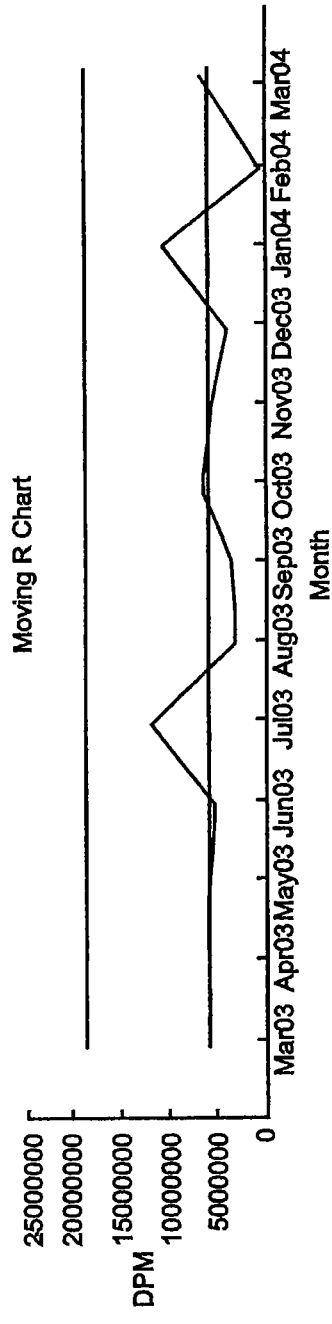
FIG. 11B

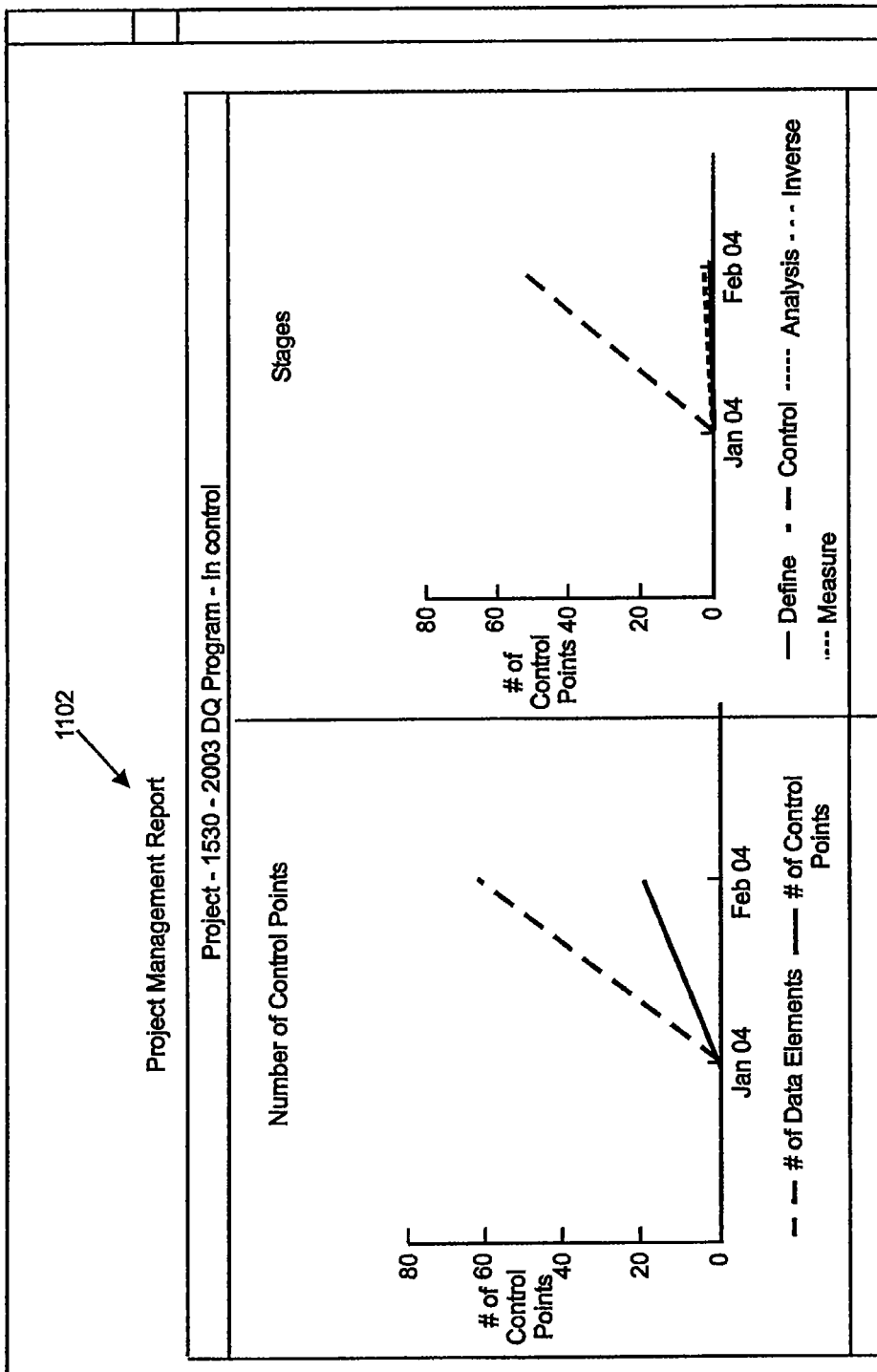

FIG. 13

```
                                                    Data Quality Metric (DQM) ─1302
                                        Home  Admin  CBT  FAQ  Feedback
                                        1312 1314  My Profile
  Project  CTQ Perf.  CTQ Info  Project Goals  Alerts   [Update and Test Run] [Cancel]
  1304     1306      1308      1310                                    ─1334  ─1336
  UPDATE CTQ SCHEDULE ─1316
  ID - Title    2015-Invalid Account and Policy Numbers
                                   ─1318                Status:  [Active ▽] ─1320
  Schedule:   ⦿ Weekly    [Monday ▽]  of every Week      Timing: [05:00AM ET ▽] ─1322
                                        1332
              ○ Monthly By Week:  [1st ▽] [Monday ▽] of the Month
              ○ Monthly By Day:   [1 ▽]  day of the Month
              ○ Daily:              Run on next available schedule
              □ Post results under last month/week
              1338
  Data Sourcing ─1324
  Database:   [1466 - nbdaa99@The W ▽] ─1326
  Defect SQL: select
              count(*) as policycnt
              from wdwmct.amg_ins                                   ─1328  ◁▷
              where (play_cert_id like '11111111%' or
                     play_cert_id like '22222222%' or
  Opportunity select count(*)
  SQL:        from VDWMCT.amg_ins                                   ─1330  ◁▷

1332  [Update and Test Run] [Cancel]
                                                 ─1334              ─1336
```

1300

```
                    1414      Data Quality Metric (DQM)   1402
                  Home    Admin    CBT    FAQ    Feedback
    My Profile
Impact Business Sigma Control
        1420                     1426
                    Add New CTQ Definition
    UOM Stage  1422      Scheduler                          1424
    DPMO Control  ☑      Manual Entry Only  ☐
                  1428
    DPMO Control  ☑      Manual Entry Only  ☐

Add New CTQ Definition
    UOM Stage             Scheduler
    DPMO Control  ☑       Daily - Active    ☐

DPM TBD       ☑       Every Tuesday    ☐
                          Active

Add New CTQ Definition
    UOM Stage             Scheduler
    Var  TBD      ☑       Every 1st - Active  ☐

Var  TBD      ☑       Every 1st - Active  ☐

Var  TBD      ☑       Every 1st - Active  ☐

Var  TBD      ☑       Every 1st - Active  ☐

Var  TBD      ☑       Every 1st - Active  ☐

Var  TBD      ☑       Every 1st - Active  ☐

Var  TBD      ☑       Every 1st - Active  ☐

⊘ Trusted sites
© 2003 Bank of America Corporation
```

FIG. 14B

| FIG. 14A | FIG. 14B |

FIG. 14

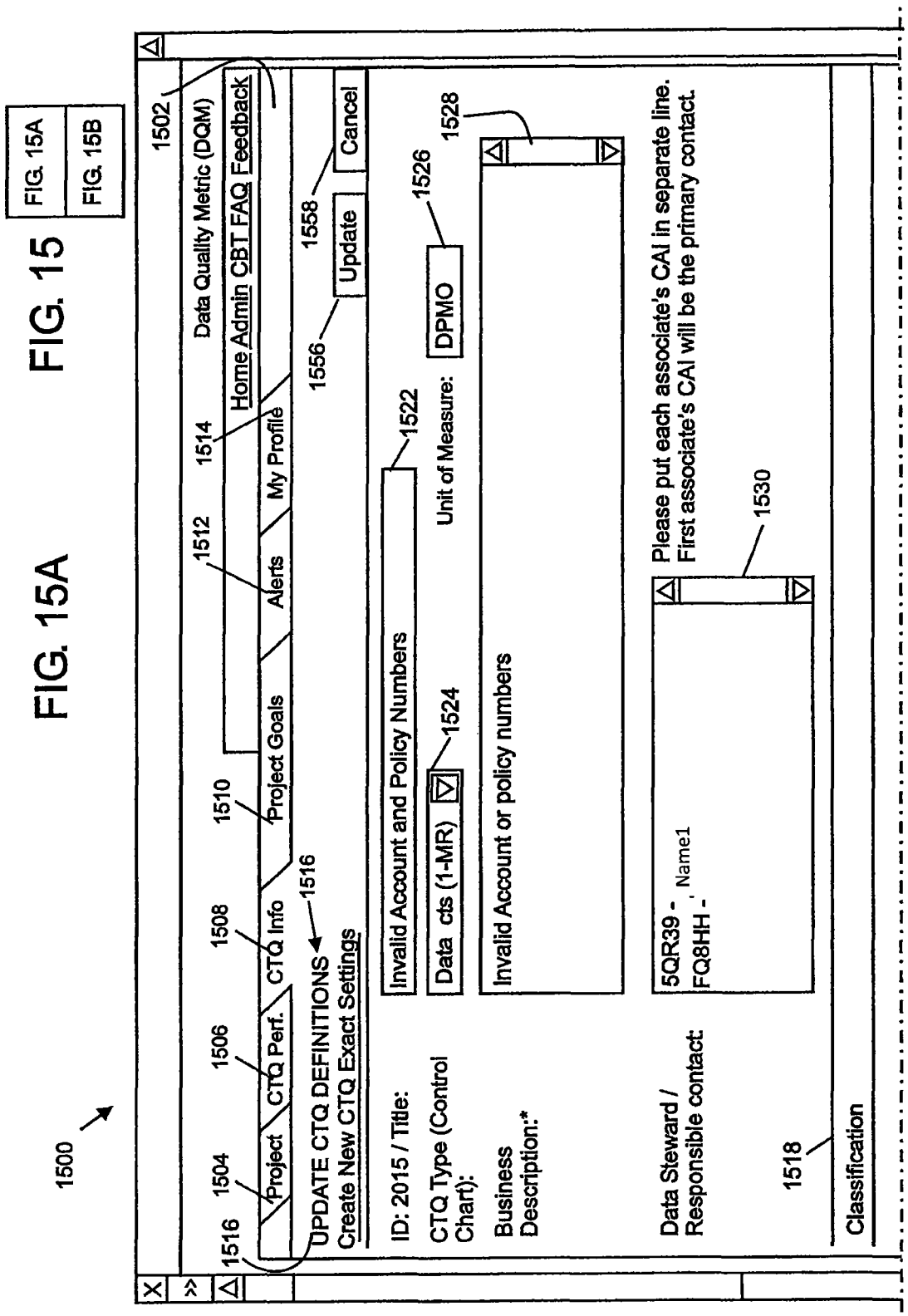

FIG. 15B

- Project:* [Project Name] —1532  Define ▽ —1534
- Line of Business:* [Business Name]  CTQ (DMAIC) Stage: ▽ —1536
- Category: [Category Name]  —1538  Add Category ▽ —1540
- Data Element: [XXXX- Account Number] —1542
- Impact Business Partner: ▽ —1544
- Region: [All] ▽ —1520  Source System: [N/A] ▽ —1546

Misc. Information

- Baseline:
  Date (YYYY-MM-DD) —1548   Defect#/Ver# —1550   Opportunity# (if applicable) —1552
- Instruction to Fix (or other comments) —1554

FIG. 20

METHOD AND SYSTEM FOR DATA QUALITY MANAGEMENT

COPYRIGHT NOTICE

A portion of the disclosure of this patent document contains material that is subject to copyright protection. The copyright owner has no objection to the facsimile reproduction by anyone of the patent document, or the patent disclosure, as it appears in the Patent and Trademark Office patent files or records, but otherwise reserves all copyright rights whatsoever.

BACKGROUND OF INVENTION

The present invention relates to managing data, information or the like and more particularly to a method and system for data quality management.

Easy access to accurate, reliable data can be critical in decision making and the operation of a business. Data may be collected to analyze and evaluate trends to provide better or improved products and services to customers both within an organization and external to an organization. Data may also be collected to detect problems and to permit analysis for developing plans to improve operations and for other purposes. Automated and standardized data quality metrics, collection, management and presentation can significantly improve the accuracy and reliability of the data in making business decisions and operating a business.

BRIEF SUMMARY OF INVENTION

In accordance with an embodiment of the present invention, a method for data quality management may include collecting data related to a project. The method may also include generating a predetermined representation of the data and implementing or performing an improvement related to the project in response to the representation of the data indicating a trend toward not meeting a predefined project goal. The method may further include defining a control plan in response to the data indicating a trend toward meeting the predefined project goal.

In accordance with another embodiment of the present invention, a method for data quality management may include sending a query to a source database to collect data associated with a key characteristic of an element associated with a project. The method may also include comparing the collected data to a predefined project goal and generating a run chart based on comparing the collected trend data to the predefined project goal. The method may further include implementing an improvement related to the project in response to the run chart indicating a trend toward not meeting the predefined project goal. A control plan may be defined in response to a control chart indicating a trend being out of control.

In accordance with another embodiment of the present invention, a system for data quality management may include a data structure operable on a processor to collect data related to a project. The system may also include a data structure to generate a predetermined representation of the data. Means may be included to implement an improvement related to the project in response to the representation of the data indicating a trend toward not meeting a predefined project goal. The system may further include means to define a control plan in response to the data indicating a trend being out of control.

In accordance with another embodiment of the present invention, a computer program product for data quality management may include a computer readable medium having computer readable program code embodied therein. The computer readable medium may include computer readable program code configured to collect data associated with each key characteristic of an element associated with a project. The computer readable medium may also include computer readable program code configured to generate a predetermined representation of the data. The computer readable medium may further include computer readable program code configured to generate an alert in response to any key characteristic being out of control.

BRIEF DESCRIPTION OF THE SEVERAL VIEWS OF THE DRAWINGS

FIGS. 1A and 1B (collectively FIG. 1) are an example of a method for data quality management in accordance with an embodiment of the present invention.

FIG. 3 is a block diagram of an exemplary system for data quality management in accordance with an embodiment of the present invention.

FIG. 13 is an example of a web page, GUI or the like in a data quality management system to update a CTQ query schedule and to enter or edit CTQ queries in accordance with an embodiment of the present invention.

FIG. 15 is an example of a web page, GUI or the like in a data quality management system to update CTQ definitions in accordance with an embodiment of the present invention.

FIG. 20 is an example of a web page, GUI or the like in a data quality management system to update or edit a project in accordance with an embodiment of the present invention.

DETAILED DESCRIPTION OF THE INVENTION

Figure 2:
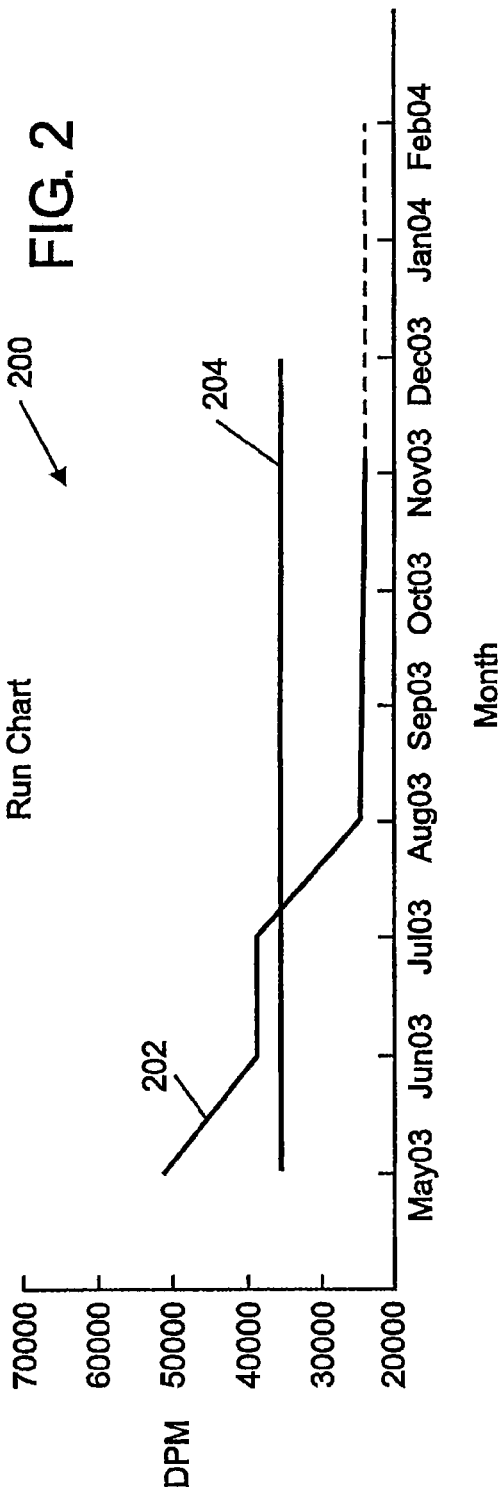
FIG. 2 is an example of a run chart and associated table that may be presented to a user in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable storage medium may be utilized. The computer-usable or computer-readable storage medium may be, for example but not limited to, an electronic, magnetic, optical, or semiconductor system, apparatus or device medium. More specific examples (a nonexhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can store the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following is a list of definitions for terms and abbreviations used in describing the invention. These terms and definitions are merely provided for purposes of explaining and understanding the invention. Other terms and definitions may be applicable as well and the invention is not intended to be limited by the specific terms and definitions used herein.

(1) CTQ (Critical to Quality). CTQ is a term used in association with Six Sigma Quality programs or environments. However, CTQs may be applicable in any business or environment desiring to improve quality and may be any key measurable characteristics of a product or process whose performance standards or specifications limits are desired to be met in order to satisfy customers. CTQs may align improvement or design efforts with customer requirements. CTQs may represent product or service characteristics that may be defined by the customer (internal or external). They may include the upper and lower specification limits or any other factors related to the product or service. A CTQ may be interpreted from a qualitative customer statement to an actionable, quantitative business specification.

(2) Data Element or Element may be the logical representation of data entity attributes that provide the basis for the physical implementation of data elements or database table columns in information systems.

(3) Defect may be any nonconformity in a product or process. May also be any event that does not meet the performance standards CTQ of an entity. Examples of defects may include completeness or missing, accuracy, validity, timeliness or the like. Completeness or missing may mean that data is not populated or missing. Accuracy may mean that data cannot be verified as fact or accurate. Validity may mean that data is populated but may not be valid. Timeliness may means that the data is late.

(4) DPM (Defects per Million). The number of defects that may be encountered in one million outputs.

(5) DPMO (Defects per Million Opportunities). The average number of defects per unit observed during an average production run divided by the number of opportunities to make a defect on the product under study during that run normalized to one million.

(6) LCL (Lower Control Limit). LCL may be a horizontal line on a control chart or the like that represents the lower process limit capability of a process.

(7) Mean-Measure of central tendency where data values are summed and divided by the number of data points; may also be the average.

(8) OCAP (Out of Control Action Plan). OCAP may be a plan to bring a program, project, element, CTQ or the like back within limits or between the LCL and Upper Control Limit (UCL) on a control chart or the like.

(9) ODBC (Online DataBase Connection). ODBC may be a connection, link or path to a database, data source or the like via a network, such as the Internet, intranet or other private network.

(10) Out of Control may refer to rejecting the assumption that the current data are from the same population as the data used to execute the initial control limits. May also refer to any project, program, element, CTQ or the like that may be outside predefined limits such as LCL and UCL or similar limits.

(11) Program may be a system of projects.

(12) Project may be a planned undertaking.

(13) SOR-System of Record.

(14) UCL (Upper Control Limit). UCL may be a horizontal line on a control chart or the like that may represent an upper limit of process capability.

(15) User: Administrator may be an individual who sets up programs and projects per requests from a Project Leader or similar individual. Administrator may also perform database maintenance and update functions or similar functions or operations.

(16) User: Data Steward may be an individual whose role may be assigned by an Administrator, Project Leader or similar individual to provide the capability to perform selected functions, such as updating, editing or similar functions related to assigned defects, CTQs, or the like.

(17) User: General may have read-only authorization.

(18) User: Project Leader may set up CTQs, assign Data Steward roles for assigned programs, projects or like. Project Leader privileges may be assigned by the Administrator or similar individual.

FIGS. 1A and 1B (collectively FIG. 1) are an example of a method 100 for data quality management in accordance with an embodiment of the present invention. Different functions, operations or events of the method 100 may be performed by or involve different entities, individuals, systems or the like as illustrated in FIG. 1. Examples of the different entities, individuals, systems or the like may include (not an exhaustive list) Data Steward 102, Data Quality (DQ) Project 104 or DQ Project Team, Data Quality Metric (DQM) which may be an online or web-enabled tool or system for data quality in accordance with an embodiment of the present invention. The invention is not intended to be limited by the entity, individual or system that may perform or be involved with a particular function or feature of the method 100.

In block 108, the method 100 may begin. The method 100 may be started by the Data Steward 102 or similar trained, skilled and authorized individual. In block 110, a project, elements, data elements or the like may be defined along with key measurable characteristics (CTQs) of the elements or data elements may be defined. A project name may be identified and project leadership and hierarchy may be selected or determined.

In block 112, information associated with the project defined in block 110 may be entered into a data quality management system, data quality metric, or the like. As will be described in more detail herein, a graphical user interface (GUI) or the like may be presented to a user, project leader or the like, to enter or edit information associated with a project or program. Examples of the project information that may be entered may include defect definitions; project goals; CTQs; CTQ queries in a structured query language (SQL) or similar format; data connectivity parameters; execution schedules or time schedules for generating or sending the CTQ queries to retrieve data related to the project; or similar project related information that may be dependent upon the particular nature of the project, elements, CTQs, etcetera.

In block 114, data or trend data may be collected on a predefined time schedule that may have been entered in block 112. A query for each CTQ or CTQ SQLs or the like may be executed according to the predefined time schedule in a Data Quality Metric or Management System and sent to the appropriate source databases to collect the desired data or trend data for each CTQ. In block 116, a predetermined representation of the data may be formed for each CTQ and presented to a user. The data or trend data may be compared to the goals for each CTQ and a run chart or the like may be generated and presented to the user. Accordingly, the predetermined representation of the data may be a run chart, spreadsheet or similar data representation for each CTQ. FIG. 2 is an example of a run chart 200 that may be presented to a user. The run chart 200 may be a graph representing trend data 202 of defects per million (DPM) or other key measurable characteristic (CTQ) of a product, service or the like over a predetermined time period compared to a goal for the CTQ that may be represented by a line 204 on the run chart 200. The trend data 202 may also be presented in a spreadsheet or table 206 format as illustrated in the example of FIG. 2.

In block 118, a determination may be made whether the project goals are being met. The determination may be made based on the predetermined representation of data or run chart 200 generated in block 116. If a determination is made in block 118 that project goals are not being met, the method 100 may advance to block 120. In block 120, an improvement function or operation may be developed or designed and implemented or performed to close the gap or difference between the trend data for the CTQ and the project goals as indicated in the predetermined representation of the data or run charts in block 116.

If project goals are being met in block 118, the method 100 may advance to block 122. In block 122, a control plan may be defined or reviewed and revised if previously defined. A Data Steward or the like may also be assigned and entered into the Data Quality Management System as will be described in more detail herein.

In block 124, a control chart may be generated for each CTQ. An example of a control chart will be described with reference to FIG. 10. An alert may be automatically generated by the method 100 or Data Quality Management or Metric System in response to a CTQ being out of control or exceeding preset limits, such as LCL and UCL limits or the like. The method 100 or Data Quality Management System may automatically generate an e-mail to advise the Data Steward or other management that the CTQ is out of control or limits.

In block 126, trends, alerts or the like may be analyzed. The analysis may be conducted by the Data Steward or others. In block 128, a determination may be made whether the trends, alerts or the like may require any action. If a determination is made that an action or actions may be needed, the method 100 may return to block 120. In block 120, as previously described, an improvement may be implemented or performed to bring the CTQ back into control or within control limits. If a determination is made that no action is required in block 128, the method 100 may end at termination 130.

Returning to block 124, the method 100 may also advance to block 132 from block 124. In block 132, a management report may be generated on the control process or similar reports, such as effectiveness of the control process or the like. The management reports may be generated using data captured in a central repository or data source. Trend reports of the control process may be run to provide a better understanding of the healthiness or effectiveness of the process. For example, high-level trends, stages of improvement, missing resources and other process related factors may be evaluated and reported. An example of management reports generated in block 132 will be described with reference to FIG. 11.

In block 134, the effectiveness of the control process may be reviewed along with any issues related to the control process. The management reports may be used to conduct the reviews. The trended management reports may support review sessions between management and the next level leaders.

In block 136, a determination may be made whether the control process is effective. If a determination is made that the control process is not effective, the method 100 may return to block 122. In block 122 the control plan may be reviewed and revised to improve effectiveness. The method 100 may then advance to block 124 and then proceed as previously described. If the control process is determined to be effective in block 136, the method 100 may end at termination 130.

FIG. 3 is a block diagram of an exemplary system 300 for data quality management in accordance with an embodiment of the present invention. Elements of the method 100 may be embodied in and performed by the system 300. The system 300 may include one or more user or client computer systems 302 or similar systems or devices.

The computer system 302 may include a system memory or local file system 304. The system memory 304 may include a read only memory (ROM) and a random access memory (RAM). The ROM may include a basic input/output system (BIOS) (not shown in FIG. 3). The BIOS may contain basic routines that help to transfer information between elements or components of the computer system 302. The RAM may contain an operating system 306 to control overall operation of the computer system 302. The RAM may also include a browser 308 or web browser and an e-mail client or application 310. The RAM may also include data structures 312 or computer-executable code for data quality management in accordance with an embodiment of the present invention that may be similar or include elements of the method 100 of FIG. 1. The RAM may further include other application programs 314, other program modules, data, files and the like.

The computer system 302 may also include a processor or processing unit 316 to control operations of the other components of the computer system 302. The operating system 306, browser 308, data structures 312 and other program modules 314 may be operable on the processor 316. The processor 316 may be coupled to the memory system 304 and other components of the computer system 302 by a system bus 318.

The computer system 302 may also include multiple input devices, output devices or combination input/output devices 320. Each input/output device 320 may be coupled to the system bus 318 by an input/output interface (not shown in FIG. 3). The input and output devices or combination I/O devices 320 permit a user to operate and interface with the computer system 302 and to control operation of the browser 308, e-mail 310 and data structures 312 to access, operate and control the data quality management system 300. The I/O devices 320 may include a keyboard and computer pointing device or the like to perform the operations discussed herein, such an entering and revising program and project information in GUIs illustrated and described herein and that form part of the data quality management system in accordance with an embodiment of the present invention.

The I/O devices 320 may also include disk drives, optical, mechanical, magnetic, or infrared input/output devices, modems or the like. The I/O devices 320 may be used to access a medium 322. The medium 322 may contain, store, communicate or transport computer-readable or computer-executable instructions or other information for use by or in connection with a system, such as the computer system 302.

The computer system 302 may also include or be connected other devices, such as a display or monitor 324. The monitor 324 may be used to permit the user to interface with the computer system 302. The monitor 324 may present the GUIs or web pages illustrated and described with reference to FIGS. 5-21 and that may form part of the data quality management system 300 in accordance with an embodiment of the present invention.

The computer system 302 may also include a hard disk drive 326. The hard drive 326 may be coupled to the system bus 318 by a hard drive interface (not shown in FIG. 11). The hard drive 326 may also form part of the local file system or system memory 304. Programs, software and data may be transferred and exchanged between the system memory 304 and the hard drive 326 for operation of the computer system 302.

The client computer system 302 may also include a network interface 328 coupled to the system bus 318. The network interface 328 may connect the client computer system to a network 330. The network interface 328 may be a modem, Ethernet card, router, gateway or the like for coupling to the network 330. The coupling may be a wired connection or wireless. The network 330 may be the Internet, private network, an intranet or the like.

The computer systems 302 may communicate with a web server 332, application server 334, database server 336 or the like, and may access other servers, such as or other computer systems similar to computer system 302 via the network 330. The web server 332, application server 334 and database server 336 may be separate servers as illustrated in FIG. 3 or may be embodied in a single server. The web server 332, application server 334 and database server 336 may communicate with one another via the network 330 or may be linked by separate communications means or a dedicated communication network, link or channel 338.

The database server 336 may include a process information and storage management database 340 or data source, a project information storage and management database 342 or data source and a Data Critical to Quality (DCTQ) information storage and management database 344 or data source. The process information and storage management database 340 may store data or information related to the data quality management process performed by the data quality management system 300. The project information storage and management database 342 may store information or data related to different projects entered into the data quality management system 300. The DCTQ information and storage management database 344 may store information or data related to the business description of the CTQ, Source database, execution schedule and SQLs used to collect performance data.

The application server 334 may communicate with a plurality of source system databases 346. The source system databases 346 may store data, such as trend data or the like, related to CTQs, projects and programs that may be entered and monitored and controlled by use of the data quality management system 300.

Figure 4:
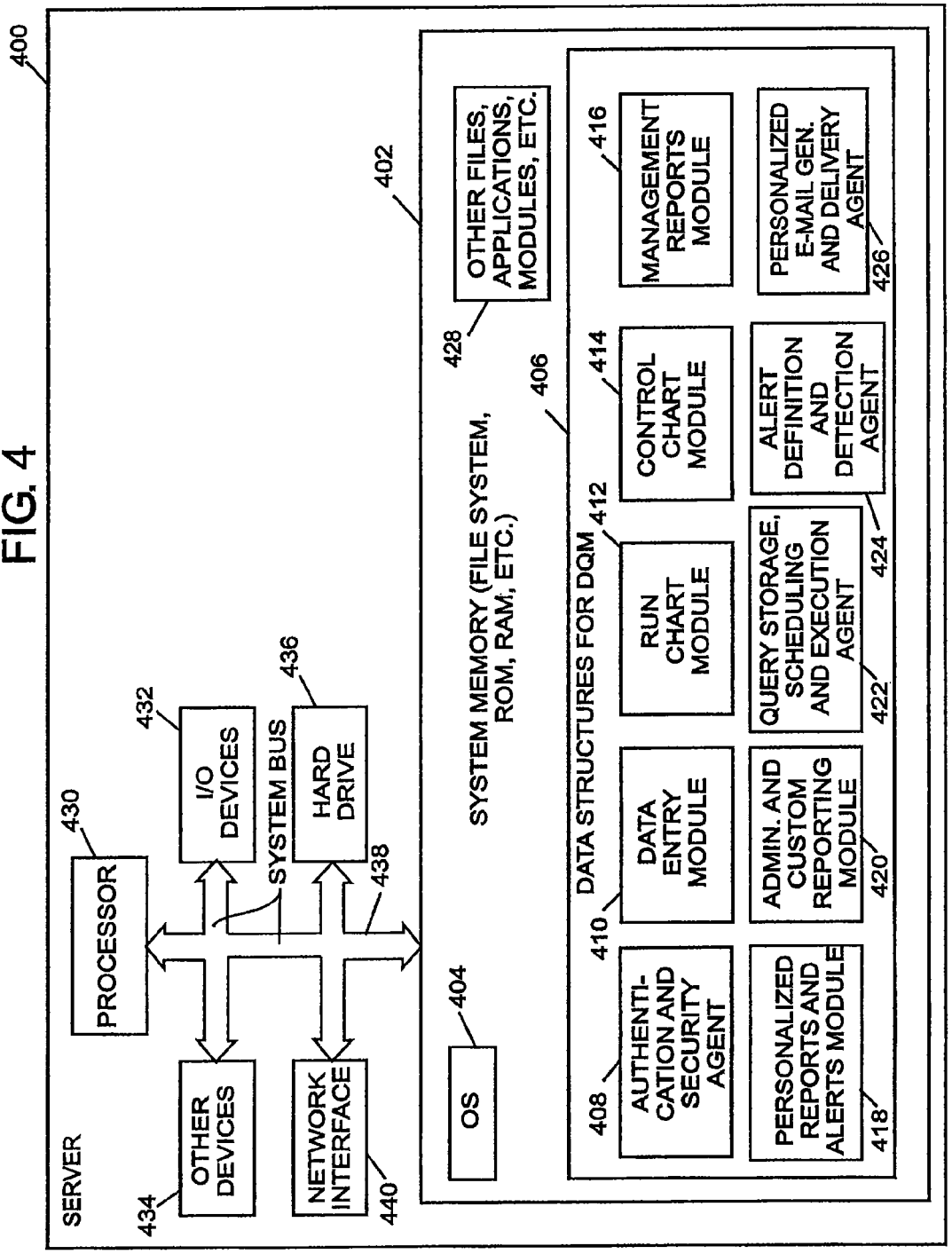
FIG. 4 is a block diagram of another exemplary server that may be used in a system for data quality management in accordance with an embodiment of the present invention.

FIG. 4 is a block diagram of an exemplary server 400 that may be used for the application server 334 in a system for data quality management in accordance with an embodiment of the present invention. The server 400 may include a system memory 402 that may include a file system, ROM, RAM and the like. The system memory 402 may include an operating system 404 similar to operating system 306 in computer systems 302. The system memory 402 may also include data structures 406 for data quality management (DQM) in accordance with an embodiment of the present invention. The data structures 406 may include operations similar to those described with respect to method 100 in FIG. 1 for data quality management. Users or clients, such as computer systems 302 or the like, may access the data structures 406 for data quality management in accordance with an embodiment of the present invention. The data structures 406 may include an authentication and security agent module 408, a data entry module 410, a run chart module 412, a control chart module 414, a management reports module 416, a personalized reports and alerts module 418, an administration and custom reporting module 420, a query storage, scheduling and execution agent 422, an alert definition and detection agent 424 and a personalized e-mail generation and delivery agent 426. The authentication and security agent 408 may authenticate any user attempting to access the system to confirm the user is authorized. A username and password entered by a user may be checked against a list or database of authorized usernames and passwords as is known in the art.

The data entry module 410 may present a GUI or GUI's to a user to enter data related to programs, projects, CTQs and the like for monitoring and control using the data quality management system. The run chart module 412 may generate and display run charts similar to that described with respect to block 116 of FIG. 1 and the exemplary run chart 200 described with respect to FIG. 2. The control chart module 414 may generate control charts similar to that provided by block 124 in FIG. 1 and as will be described with respect to the control chart example illustrated in FIG. 10 herein. The management reports module 416 may generate management reports and the like similar to block 132 in FIG. 1 and the exemplary management reports illustrated in FIG. 11 and described in more with reference to FIG. 11 below.

The personalized reports and alerts module 418 permits a user to personalize the appearance and presentation of data in the reports that may be presented to the user by the data quality management system, such as system 300, and the alerts presented to a user when a CTQ or the like is out of control or outside preset or predetermined limits. The administration and custom reporting module 420 may be used by a system administrator to customize the reporting features of the data quality management system as described and illustrated herein.

The query storage, scheduling and execution agent 422 may be responsible for storing the queries, SQLs or the like that may be used by the data quality management system in retrieving the appropriate information or data, such as trend data or the like, from the data sources or databases where the data may be stored. The agent 422 may also select the appropriate queries based on definitions and other parameters entered by a user into the system. The agent 422 may execute the queries pursuant to a predefined time schedule that may be entered into the agent 422 by a user.

The alert and definition detection agent 424 may generate and store LCLs and UCLs or similar limits to detect when a CTQ or the like is out of control or outside its preset limits. The agent 424 may then automatically generate an alert, which may be an e-mail message as described herein, to alert a Data Steward or similar person that a CTQ is out of limits and corrective action may be needed. The personalized e-mail generation and delivery agent 426 may automatically generate and deliver an e-mail including an alert in response to detecting a CTQ being out of limits by agent 424. The server system memory 402 may also include other files 428, applications, modules and the like.

The server 400 may also include a processor 430 or a processing unit to control operation of other devices in the server 400. The server 400 may also include I/O device 432. The I/O devices 432 may be similar to I/O devices 320 of computer systems 302. The server 400 may further include other devices 434, such as a monitor or the like to provide an interface along with the I/O devices 432 to the server 400. The server 400 may also include a hard disk drive 436. A system bus 438 may connect the different components of the server 400. A network interface 440 may couple the server to a network, such as network 330 in FIG. 3.

Figure 5:
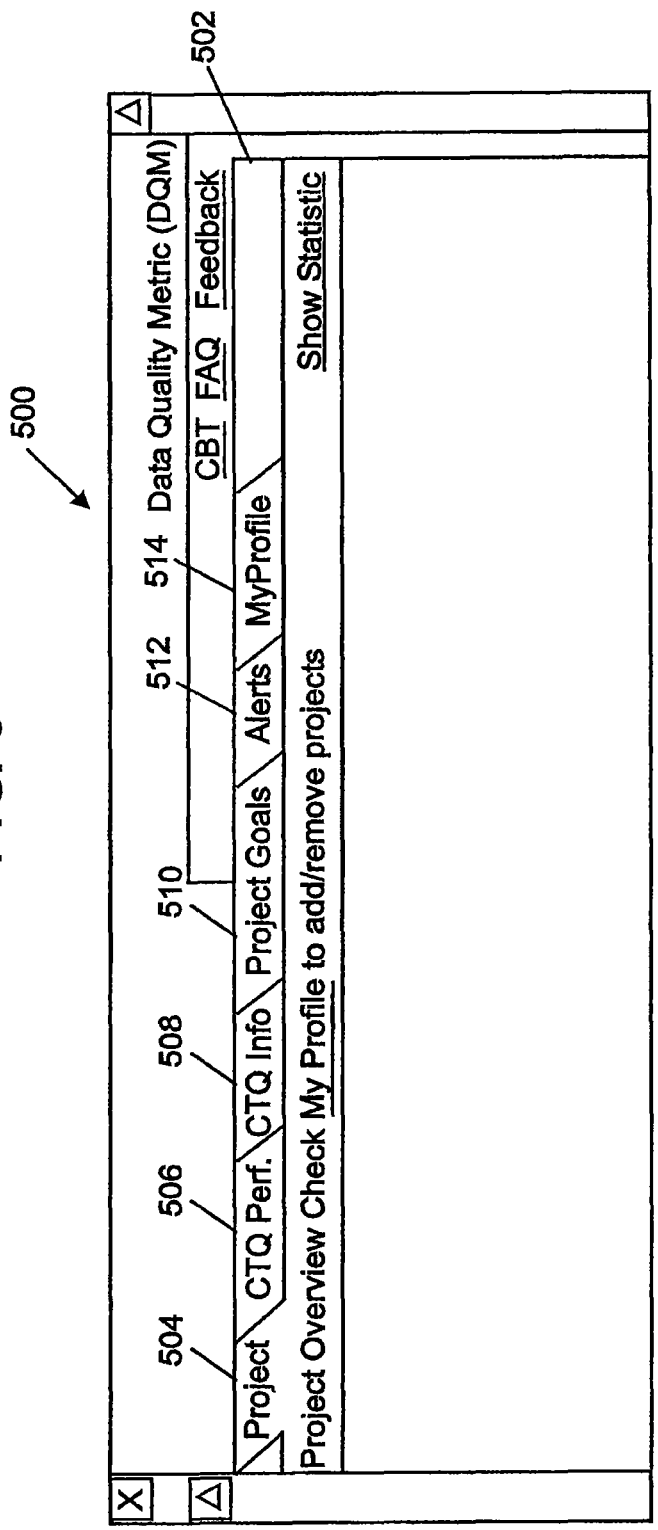
FIG. 5 is an example of a web page, GUI or the like to access a data quality management system in accordance with an embodiment of the present invention.

FIG. 5 is an example of a web page, GUI 500 or the like to access a data quality management system or data quality metric, such as system 300, in accordance with an embodiment of the present invention. The GUI 500 may be presented to a user after proper authentication, such as by module 408 (FIG. 4) or the like, and the user is permitted access to the data quality metric or data quality management system via the user's browser, similar to browser 308 (FIG. 3). The GUI 500 may include a command bar 502. The command bar 502 may include tabs 504-514 that may be clicked-on or operated using a computer pointing device, mouse or the like to access the web pages or GUIs associated with the particular tab 504-514. Each of the tabs 504-514 and the associated web pages or GUIs will be described in more detail below.

Figure 6:
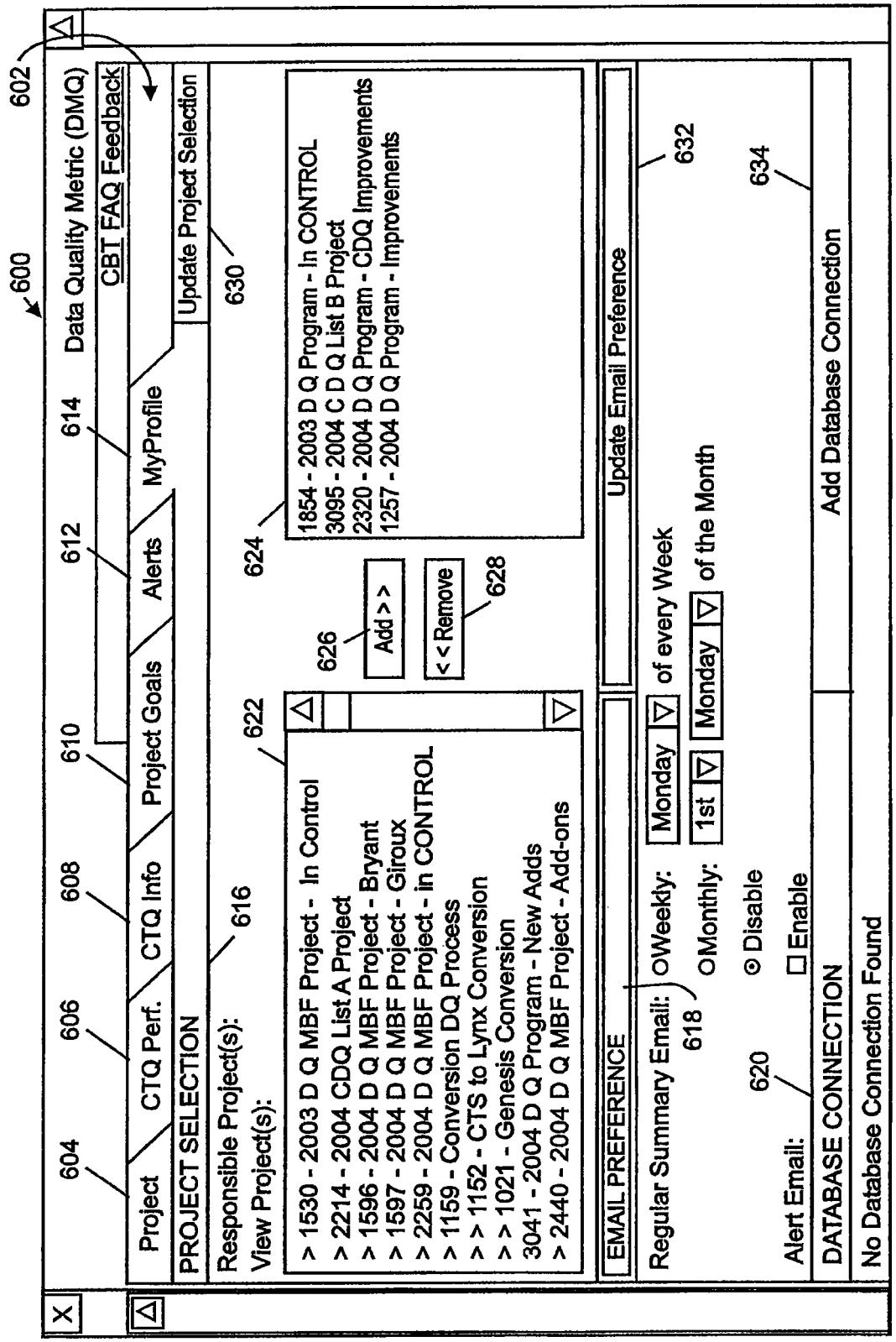
FIG. 6 is an example of a web page, GUI or the like for entering or editing user profile information in a data quality management system in accordance with an embodiment of the present invention.
Figure 7:
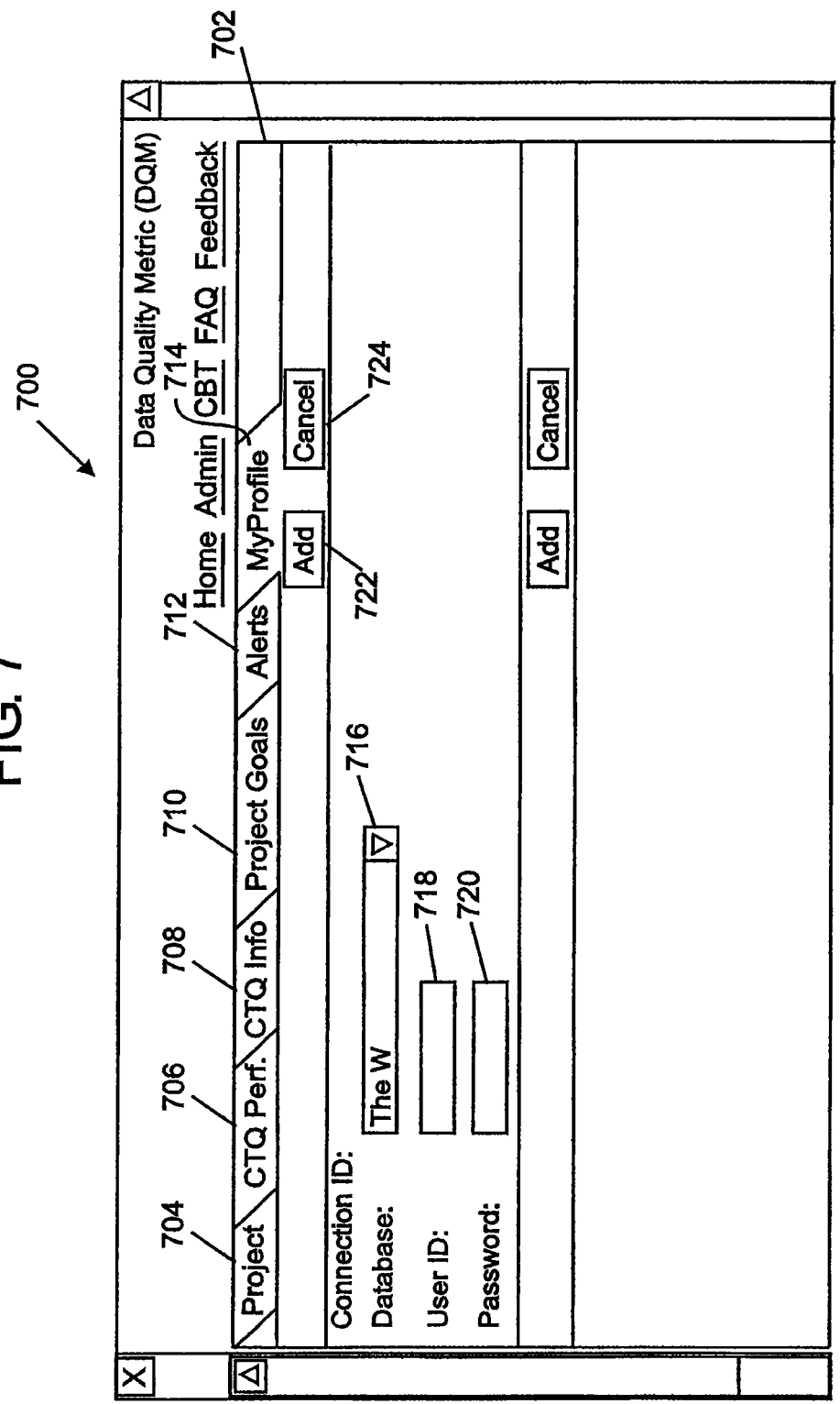
FIG. 7 is an example of a web page, GUI or the like for adding a database connection in a data quality management system in accordance with an embodiment of the present invention.

FIG. 6 is an example of a web page, GUI 600 or the like for entering, selecting or editing user profile information in a data quality management system or data quality metric (DQM), such as system 300, in accordance with an embodiment of the present invention. The GUI 600 may be accessed by a user clicking-on or activating the "My Profile" tab 514 in FIG. 5 which may be the same as the "My Profile" tab 614 in FIG. 6. The GUI 600 may be divided into different sections or segments. A first section 616 may be labeled "PROJECT SELECTION" or another appropriate legend or label that may describe the information entered, selected or edited in the section 616. A second section 618 may be labeled "EMAIL PREFERENCE" or the like, and a third section 620 may be labeled "DATABASE CONNECTION" or a similar label or legend descriptive of the information or data that may be contained and edited or selected in the section 620.

The Project Selection section 616 may include a list 622 of the projects that may be assigned to a user, Data Steward, project leader or similar individual. Projects may be selected from the list 622 using a computer pointing device or the like and added to a second list 624 of selected projects for more detailed viewing, monitoring or for other purposes. Projects may be added to the second list 624 by selecting projects in first list 622 and then clicking-on or operating a button 626 that may be labeled "Add" or the like. Projects may be removed from the second list 624 by clicking-on or operating a button 628 that may be labeled "Remove" or the like. The projects in the second or selected list 624 may be updated by the user clicking-on or activating a button 630 that may be labeled "Update Project Selection." The user may be directed to a project screen in response to clicking-on the "Update Project Selection" button 630. An example of a project screen is illustrated in FIG. 8.

In second section or "EMAIL PREFERENCE" section 618, a user may select or enter preferences with respect to automatically receiving email summaries and email alerts from the data quality management system. Email alerts may be enabled or disabled by clicking or checking the appropriate box and the user may select the timing and schedule for regular email summaries related to the projects selected or added to the selection list 624. A user's email preferences may be updated in the system by clicking-on or operating a button 632 that may be labeled "Update Email Preferences" or a similar descriptive label.

In the third section or "DATABASE CONNECTION" section 620, database connection links, paths or the like may be specified for automated data collection in response to queries generated by the system. A database entry form or GUI 700 may be presented to a user in response to the user clicking-on or operating a button 634 that may be labeled "Add Database Connection" or a similar descriptive label or legend. The database entry form or GUI 700 may include a field or drop-down list 716 to enter or select a database from which data may be collected by the data quality management system. The GUI 700 may also include a user ID field 718 and a password field 720 for a user to enter his username or ID and password that may be needed to access the database designated in field 716. The database connection selected in database field 716 may be added to the data quality management system by clicking-on or activating a button 722 that may be labeled "Add." Similarly, the process of adding a database connection may be aborted by clicking-on a "Cancel" button 724. By entering a user ID and password for the database designated in field 716 and clicking-on the "Add" button 722, the user is authorizing the data quality management system or metric to access the database designated on the user's behalf according to the schedule defined by the user.

Figure 8B:
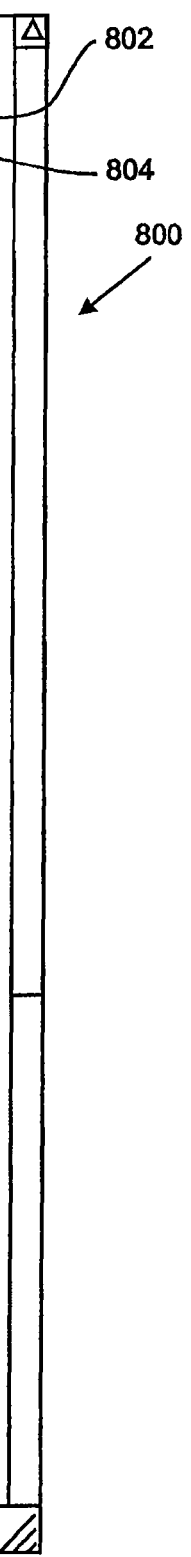
FIG. 8 is an example of a web page, GUI or the like in a data quality management system to present a program and project overview in accordance with an embodiment of the present invention.
Figure 9B:
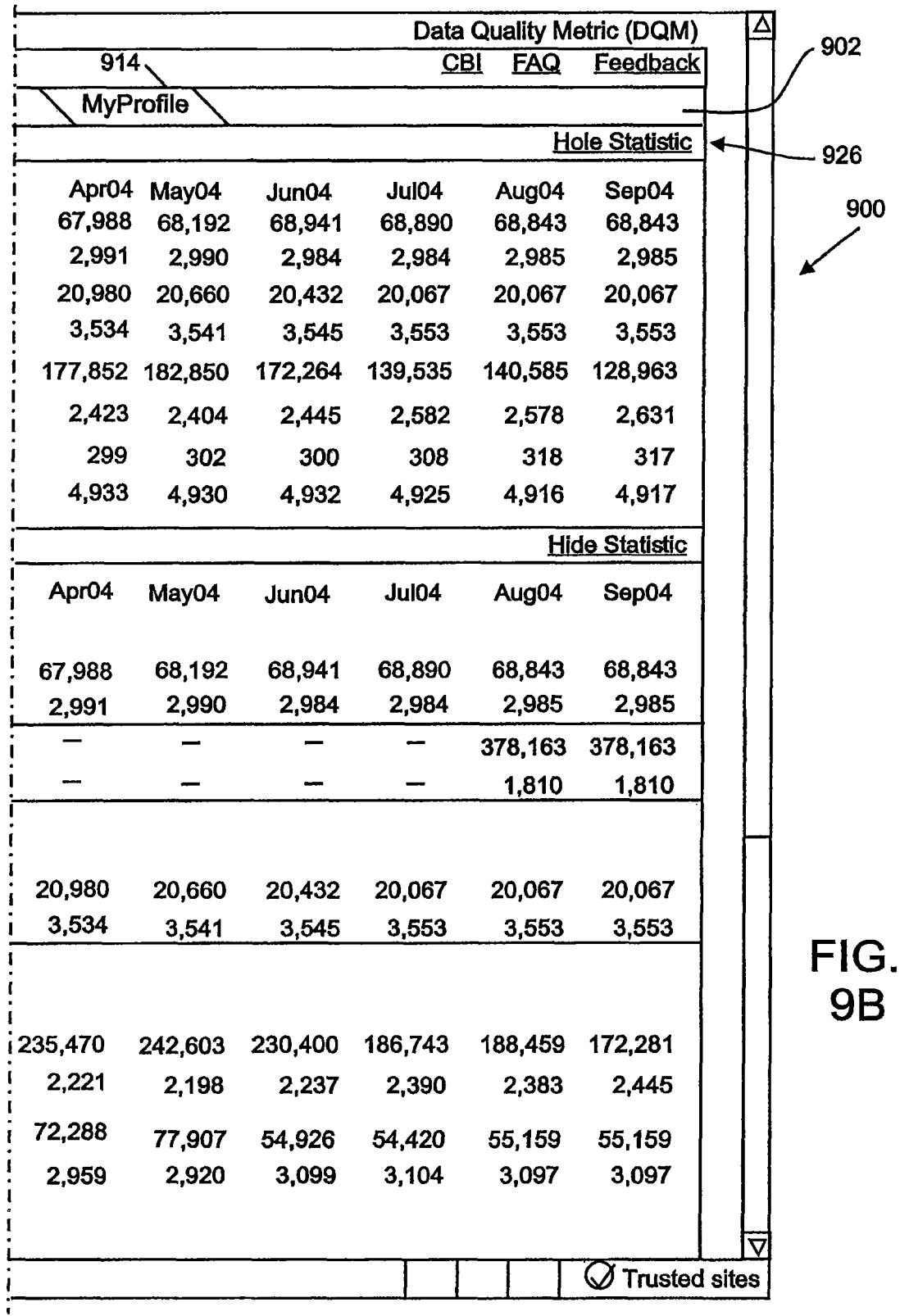
FIG. 9 is an example of a web page, GUI or the like in a data quality management system to present statistics related to all projects in accordance with an embodiment of the present invention.

FIG. 8 is an example of a web page, GUI 800 or the like in a data quality management system or metric to present a program and project overview in accordance with an embodiment of the present invention. The GUI 800 may be accessed by a user clicking-on or activating a "Project" tab 804 in command bar 802 which may be the same as or similar to the "Project" tab with a corresponding reference numeral in other GUIs illustrated in the Figures. The project screen or GUI 800 may be divided into two sections or segments. A first section 816 may be labeled "Program Overview" or other appropriate descriptive label. A second section 818 may be labeled "Project Overview" or similar label. The Project Overview section 818 may be depicted below the Program Overview section 816. The Program Overview section 816 may list all of the program level projects 818 that a user may have selected in GUI 600 or that the user has been assigned or owns. Also presented in Program Overview section 816 may be the collected data related to each program over a predetermined time horizon or time period in response to queries. In the example illustrated in FIG. 8, the data illustrated is defects per million (DPM) for a product or service on a per month basis over a selected number of months. The data illustrated also includes a "Sigma" or standard deviation associated with each statistic for each month over the time period. Other data may be presented depending upon the particular product, service or business using the data quality management system.

The second section or Project Overview section 820 may list all of the projects, their child projects and summaries 822. The data illustrated may also be DPM and Sigma as illustrated in the example of FIG. 8 or may be other data depending upon the particular product, service or business.

To view statistics for all projects in GUI 800, a "Show Statistics" link 824 may be clicked-on or operated by a computer pointing device or the like. A GUI, such as GUI 900 in FIG. 9, to present statistics 924 related to all projects may be presented to a user in response to operating "Show Statistics" link 820 in GUI 800. Examples of the statistics 924 that may be illustrated may include (not an exhaustive list) number of projects, number of CTQs, number of active queries, number of CTQs with at least one Data Steward, the number of Data Stewards associated with or assigned to each project and program or similar statistics. The statistics 924 may be hidden by operating a "Hide Statistics" link 926 or the like.

Figure 10A:
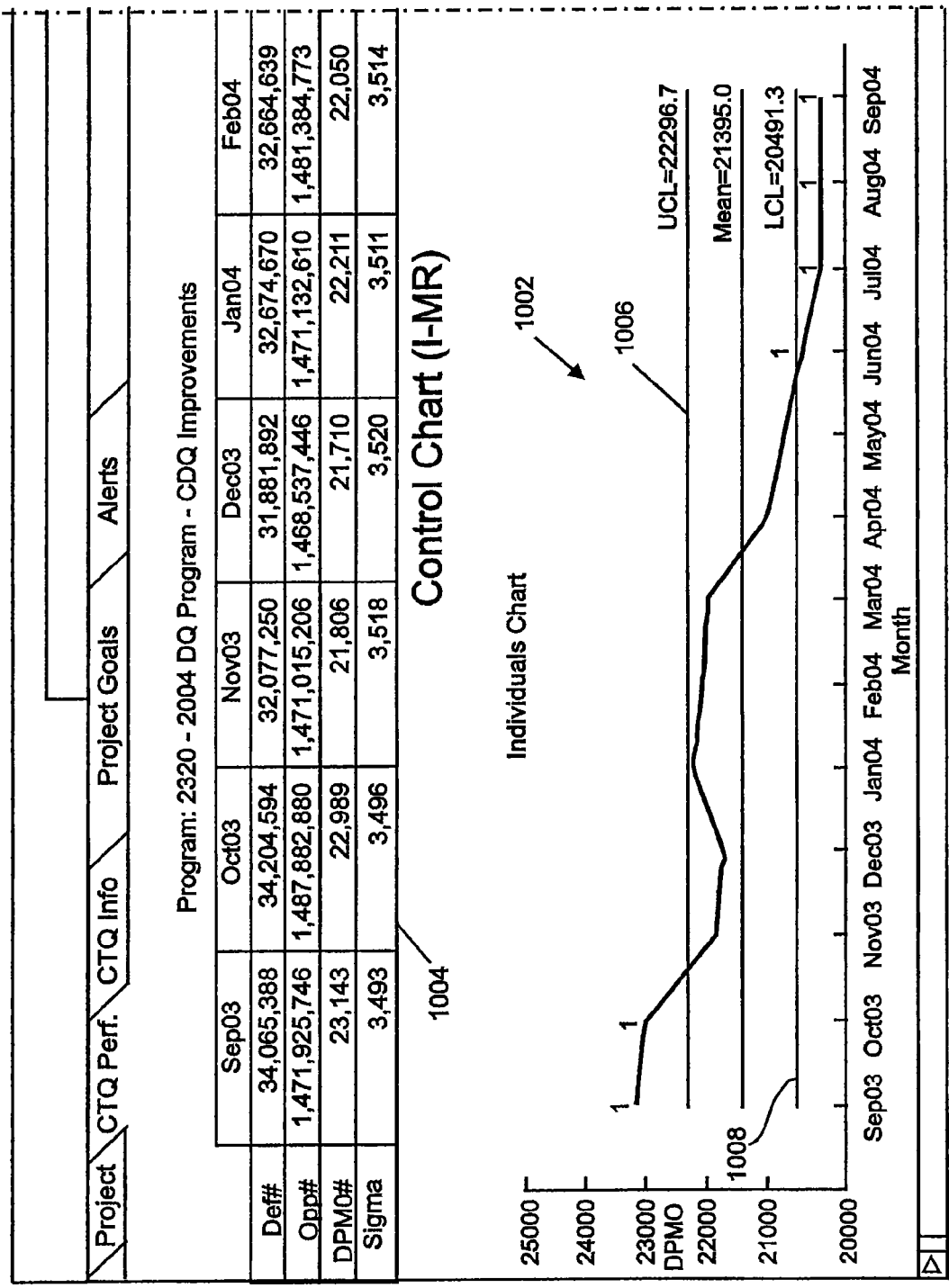
FIG. 10 is an example of a web page, GUI or the like in a data quality management system to present control charts and an associated spreadsheet in accordance with an embodiment of the present invention.
Figure 10B:
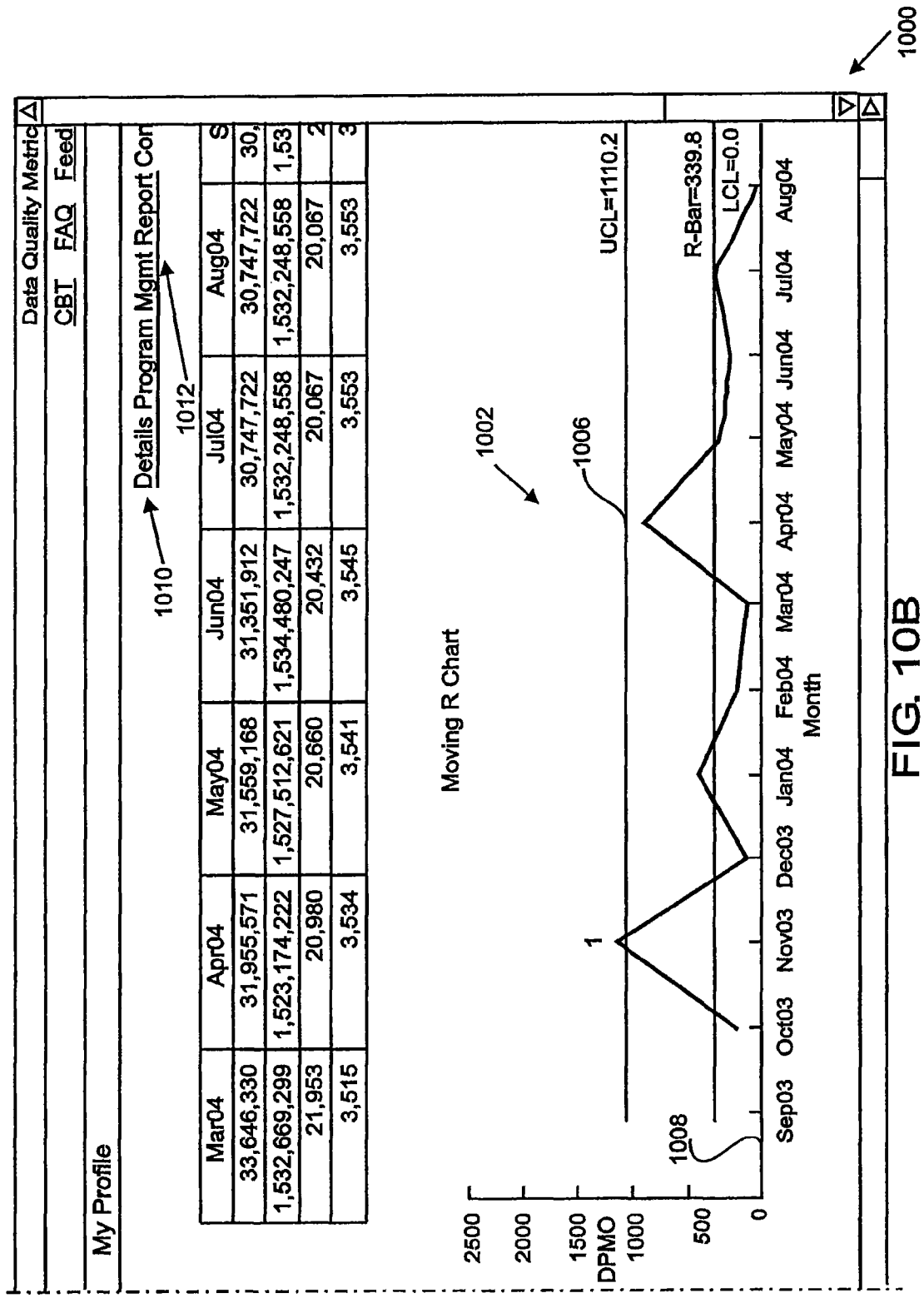

FIG. 10 is an example of a web page, GUI 1000 or the like in a data quality management system to present control charts 1002 and an associated spreadsheet 1004 or tables in accordance with an embodiment of the present invention. A control chart 1002 for a particular project may be accessed or presented by a user clicking-on a selected project or program 818 or 822 in GUI 800 or 918 or 922 in GUI 900. The control charts 1002 may be generated and presented to the user as part of the method 100 for data quality management in block 124 of FIG. 1 and control chart module 414 of FIG. 4. The control charts 1002 may indicate a UCL 1006 and LCL 1008 to indicate if any project or program may be out of control or outside of preset limits. Additionally, the statistics for any out of control project or program may be highlighted or otherwise identified in the table 1004. For example, the data may be highlighted by using a different colored font, such as red, or identified by other means. Additional details, program management reports and the like may be accessed by a user operating or clicking-on links, such as links 1010 and 1012 that may be respectively labeled "Details" 1010, "Program Mgmt. Report" 1012, or other links.

Figure 11D:
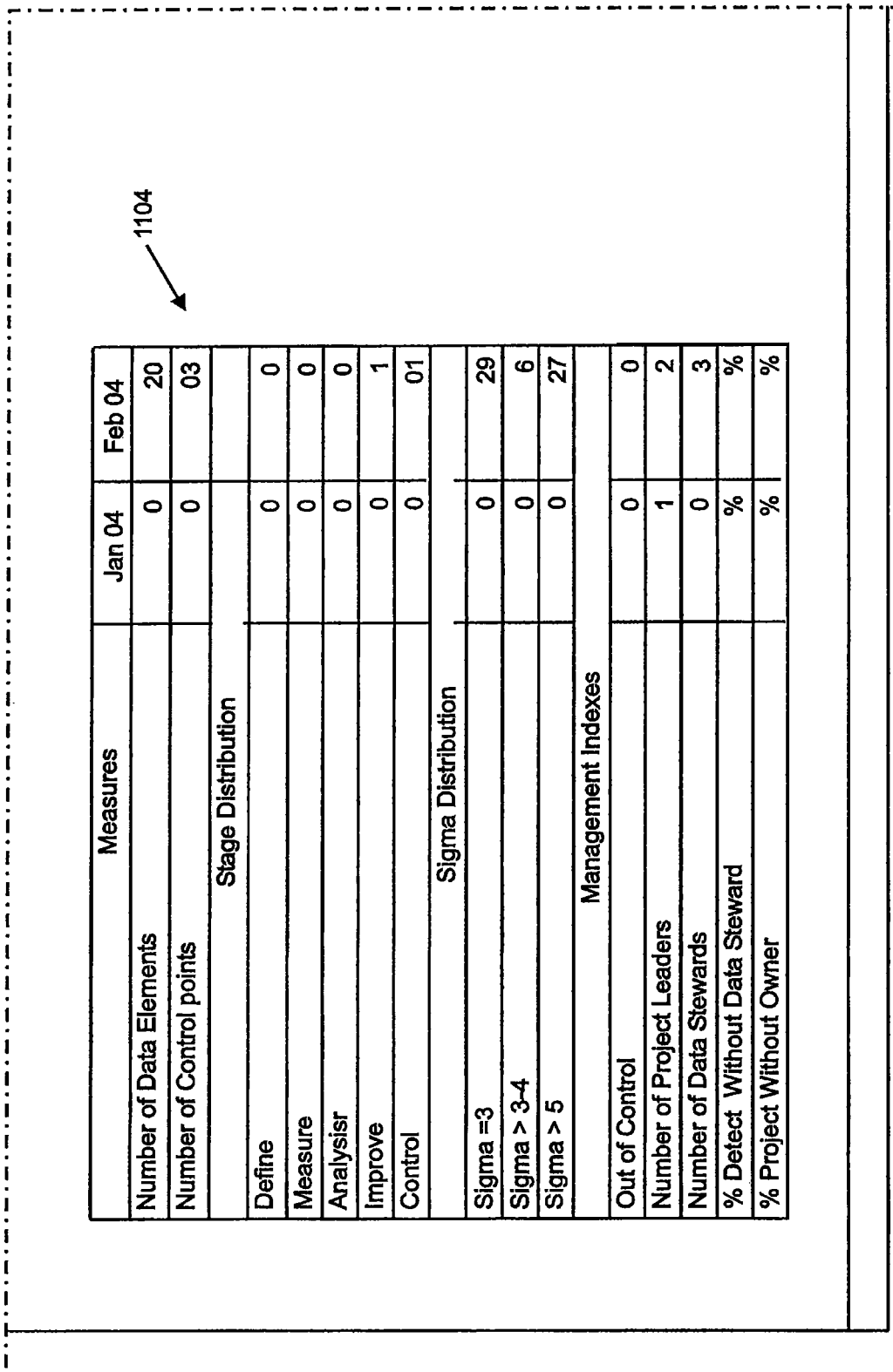
FIG. 11 is an example of a web page, GUI or the like in a data quality management system to present project management reports and associated spreadsheets in accordance with another embodiment of the present invention.
Figure 11E:
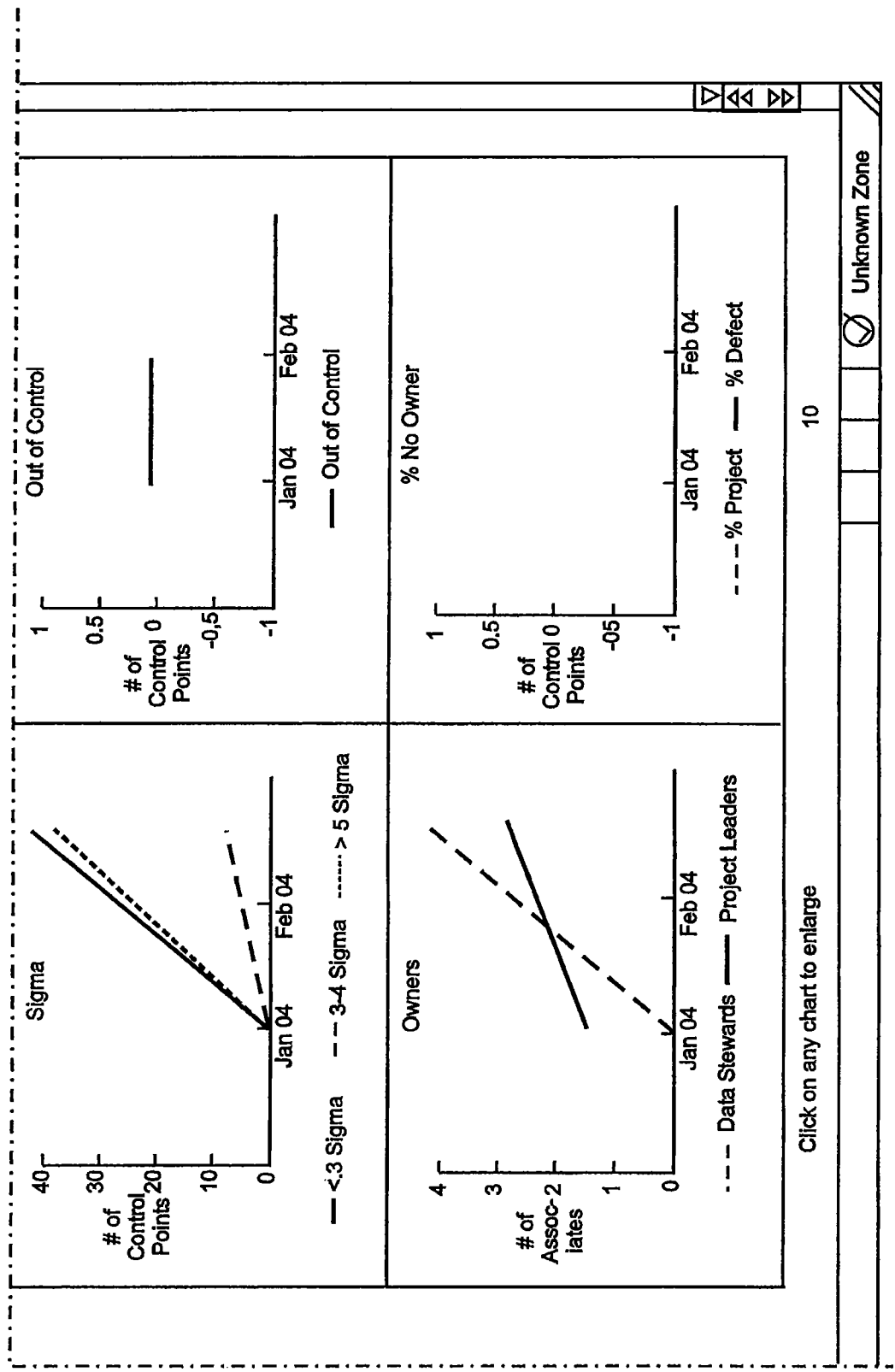

FIG. 11 is an example of a web page, GUI 1100 or the like in a data quality management system to present project management reports 1102 and associated spreadsheets or tables 1104 in accordance with another embodiment of the present invention. The project management reports 1102 and associated tables 1104 may be presented in response to the user operating the "Details" or "Program Mgmt Report" links 1010 and 1012 in GUI 1000 of FIG. 10. The management reports 1102 may be generated and presented to the user as part of the method 100 for data quality management in block 132 and management reports module 416 in FIG. 4.

Figure 12:
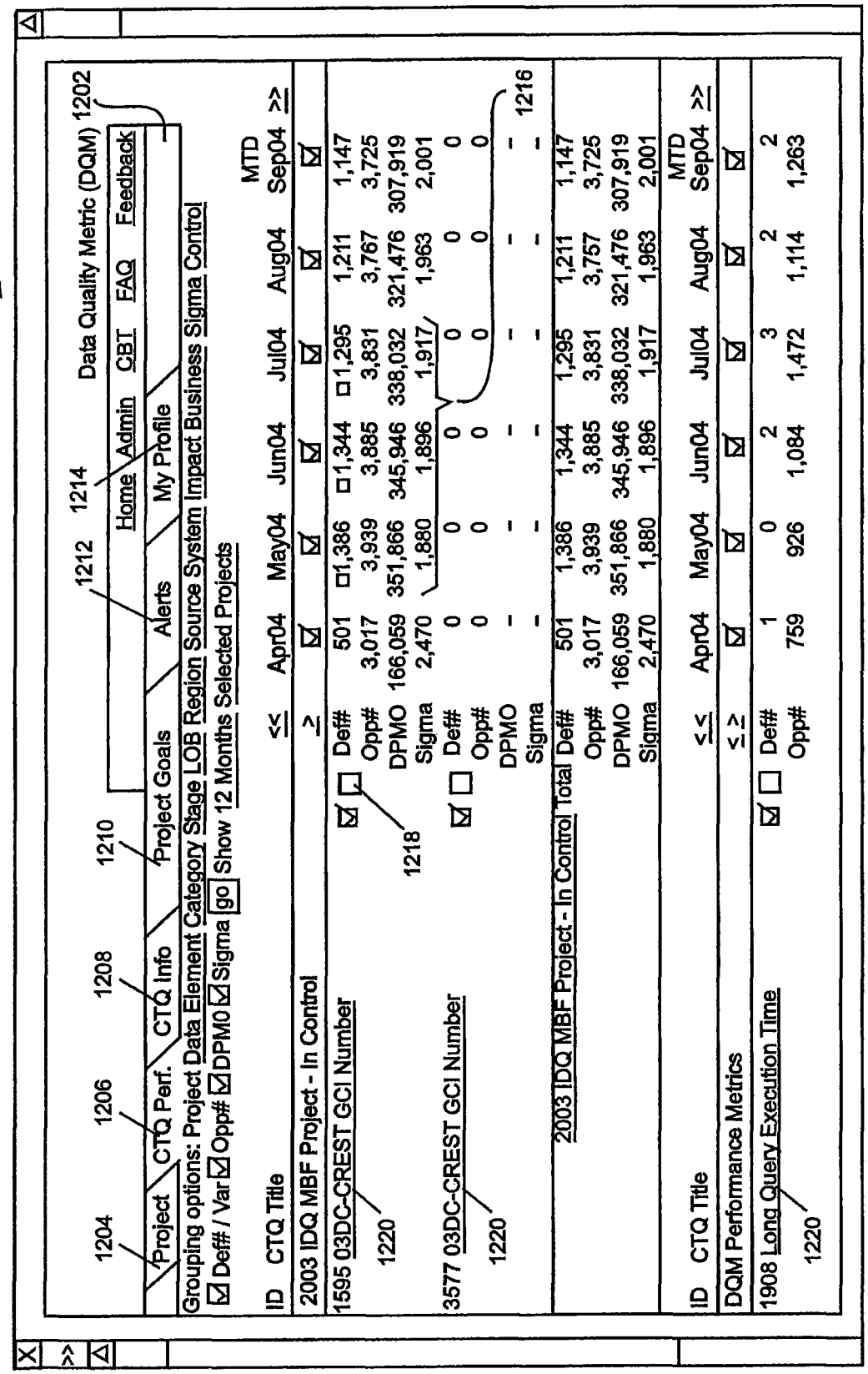
FIG. 12 is an example of a web page, GUI or the like in a data quality management system to present critical to quality (CTQ) performance in accordance with an embodiment of the present invention.

FIG. 12 is an example of a web page, GUI 1200 or the like in a data quality management system to present critical to quality (CTQ) performance data or information in accordance with an embodiment of the present invention. The "CTQ Performance" GUI 1200 may be presented in response to a user clicking-on or operating the tab 1206 in command bar 1202. The command line 1202 and tabs 1204-1214 may be similar or the same as the tabs in the GUIs illustrated in the other Figures and may perform the same functions or access the same GUIs or web pages discussed herein.

A previously discussed, statistics or data for CTQs that may be out of control or outside preset limits, such as UCL and LCL, may be identified or highlighted in the spreadsheet or table of GUI 1200. For example the statistics that are represent out of control data may be represented in a red font 1216. In GUI 1200, a user may edit a CTQ scheduler and queries by clicking-on or operating an icon 1218. The icon 1218 may be a symbol resembling a calendar, a schedule or other descriptive symbol indicative of the purpose of the icon. A control chart 1002 for a particular CTQ may be accessed or presented by a user clicking-on a selected CTQ 1220 in GUI 1200.

FIG. 13 is an example of a web page, GUI 1300 or the like in a data quality management system to update a CTQ query schedule and to enter or edit CTQ queries in accordance with an embodiment of the present invention. The GUI 1300 in FIG. 13 may be presented in response to a user clicking-on or operating the icon 1218 in FIG. 12. The GUI 1300 may include a first section or segment 1316 that may be labeled "UPDATE CTQ SCHEDULE" or a similar descriptive label. The section 1316 may include fields for a user to select or enter a schedule when a query to collect data related to a CTQ identified in an "ID-Title" field 1318 may be executed. The "UPDATE CTQ SCHEDULE" section 1316 may also include a field 1320 to select or enter a status of the CTQ query and a field 1322 to select or enter a timing for the CTQ query.

The GUI 1300 may also include a second section or "Data Sourcing" section 1324. The "Data Sourcing" section 1324 may include a field 1326 to enter or select a database connection. The "Data Sourcing" section 1324 may also include a "Defect SQL" field 1328 for a user to enter or define a SQL to collect the number of defects from the source database. The "Data Sourcing" section 1324 may further include an "Opportunity SQL" field 1330 for a user to enter or define a SQL to collect the number of opportunities (measurement population) from the source database. The CTQ schedule and queries entered or edited in GUI 1300 may be updated and the query tested without posting the results by a user clicking-on or operating a button 1332 that may be labeled "Update and Test Run" or similar descriptive legend or label. "Test" may also be selected in the drop-down Status field 1320 to test run a query without posting any results. Alternatively, the CTQ schedule and queries may just be updated by a user clicking-on or operating a button 1334 that may be labeled "Update" or the like. The entered data in GUI 1300 may be canceled by a user operating a "Cancel" button 1336. When the "Status" box is set to "Active," the data quality management system may run the query and post the results to the current month unless the "Post Results Under Last Month/Week" box 1338 is checked.

Figure 14A:
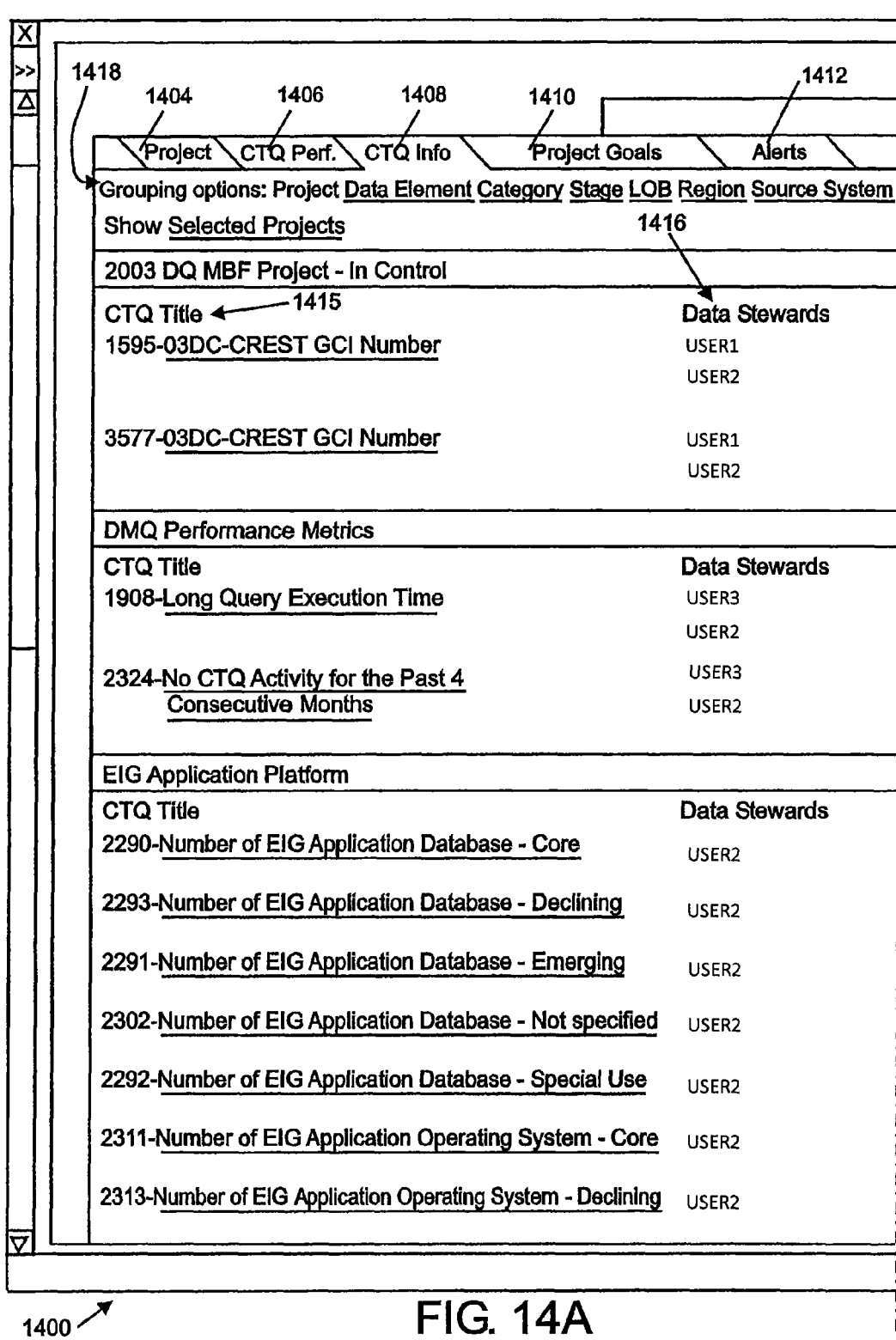
FIG. 14 is an example of a web page, GUI or the like in a data quality management system to present CTQ information to a user in accordance with an embodiment of the present invention.

FIG. 14 is an example of a web page, GUI 1400 or the like in a data quality management system to present CTQ information to a user in accordance with an embodiment of the present invention. The GUI 1400 may be presented to a user in response to the user clicking-on or operating a "CTQ Info" tab in any of the GUIs illustrated in the Figures which is designated by the reference numeral 1408 in FIG. 14. The GUI 1400 may list the title 1415 of each CTQ and indicate the Data Steward or Stewards 1416 assigned to each CTQ. The CTQ information may be presented in different formats by clicking-on different options in a "Grouping Options" line 1418 or section. The CTQ Information GUI 1400 may also provide information about Unit of Measure (UOM) and CTQ stage 1420 as they are specified in a "Unit of Measure" field 1526 and a "CTQ Stage" field 1534 in GUI 1500. The CTQ Information GUI 1400 may also provide access to the CTQ scheduler 1422 to schedule and define CTQ queries similar to that previously described. The CTQ scheduler may be edited by clicking-on an icon 1424 that may represent a calendar or other symbol to represent scheduling CTQ queries. New CTQ definitions may be added by clicking-on an "Add New CTQ Definition" link 1426. The CTQ definitions may be edited by clicking on an edit CTQ definition icon 1428 or similar symbol indicative of editing a CTQ definition.

FIG. 15 is an example of a web page, GUI 1500 or the like in a data quality management system to update or edit CTQ definitions in accordance with an embodiment of the present invention. The GUI 1500 may be presented to a user in response to the user clicking-on or activating the edit CTQ definition icon 1428 in GUI 1400. The GUI 1500 may be divided into an "Update CTQ Definition" Section 1516, a "Classification" section 1518 and a "Misc. Information" section 1520.

The "Update CTQ Definition" Section 1516 may include a "Title" field 1522 to enter or edit a title for the CTQ. A "CTQ Type (Control Chart) field 1524 may be included in section 1516 to enter a CTQ type and a type of control chart to be generated. Other fields may include a "Unit of Measure" field 1526, a "Business Description" field 1528, a "Data Steward/Responsible Contact" field 1530 or the like.

The "Classification" section 1518 may include a "Project" field 1532 to enter or select a project identification, a "CTQ Stage" field 1534 to enter or select from a drop-down list a CTQ stage, a "Line of Business" field 1536, a "Data Element" field 1540, an "Impact Business Partner" field 1542, a "Region" field 1544 and "Source System" field 1546.

The "Misc. Information" section 1520 may include baseline information, such as a date field 1548, defect number field 1550, opportunity number field 1552, instructions to fix field 1554 and the like. The updated or edited CTQ information may be updated and stored by the system in response to a user clicking-on or operating a button 1556 that may be labeled "Update" or the like. The CTQ information or update may be canceled before being saved in the system by clicking-on a "Cancel" button 1558.

Figure 16:
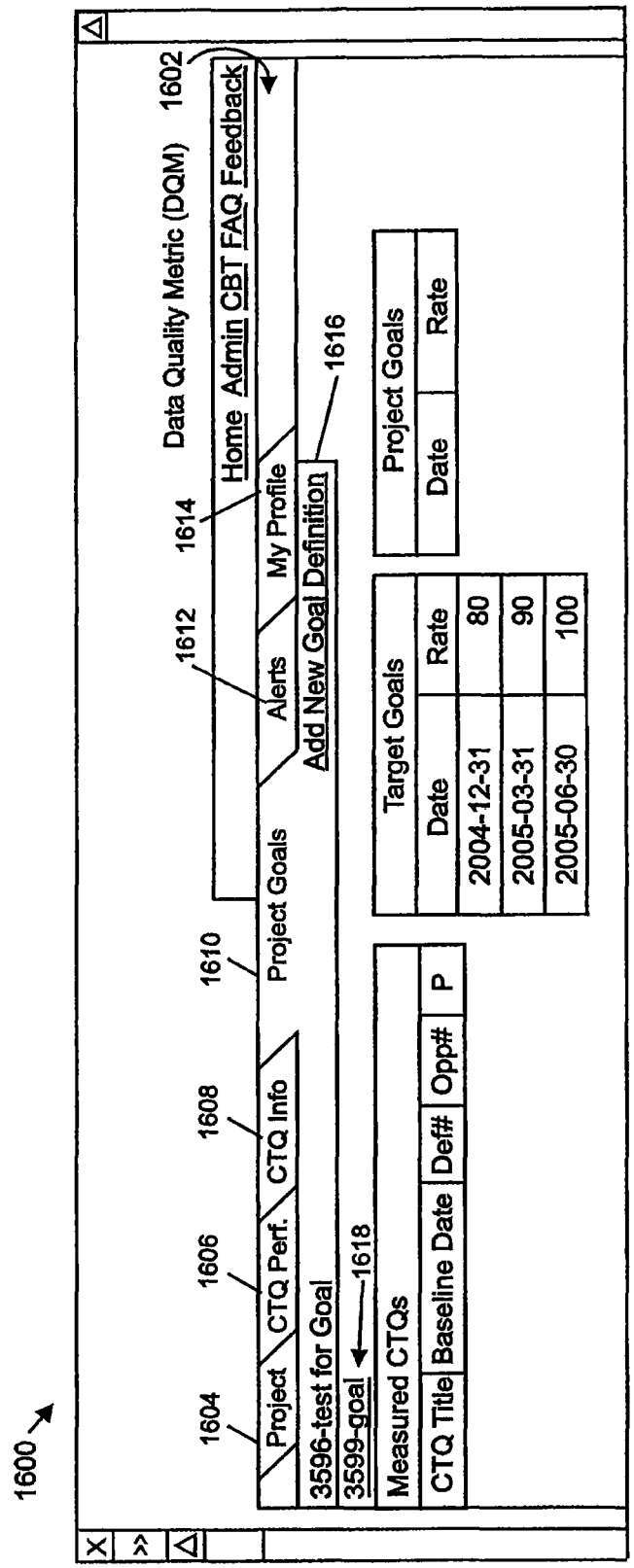
FIG. 16 is an example of a web page, GUI or the like in a data quality management system to present project goals in accordance with an embodiment of the present invention.

FIG. 16 is an example of a web page, GUI 1600 or the like in a data quality management system to present project goals in accordance with an embodiment of the present invention. The GUI 1600 may be presented to a user in response to the user clicking-on a "Project Goals" tab (tab 1610 in FIG. 16) in any of the GUIs illustrated in the drawings.

Figure 17:
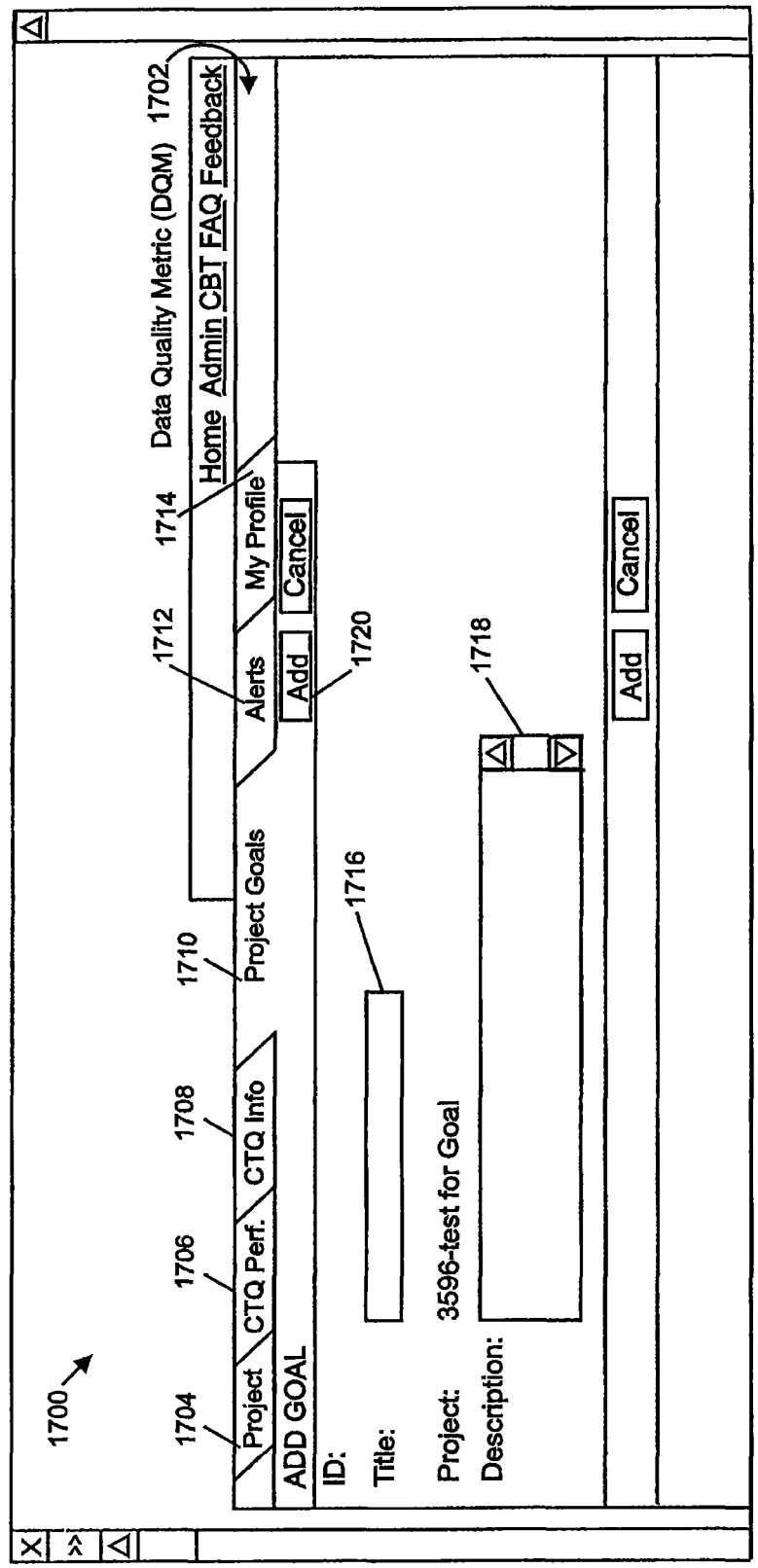
FIG. 17 is an example of a web page, GUI or the like in a data quality management system to add a project goal in accordance with an embodiment of the present invention.

FIG. 17 is an example of a web page, GUI 1700 or the like in a data quality management system to add a new project goal in accordance with an embodiment of the present invention. The GUI 1700 may be presented in response to a user clicking-on or activating a link 1616 in GUI 1600 that may be labeled "Add New Goal Definition" or similar label. The GUI 1700 may include a "Title" field 1716, a "Description" field 1718 and any other appropriate fields to identify a project goal. The project goal may be added in response to the user clicking-on or operating a button 1720 that may be labeled "Add" or a similar label.

Figure 18:
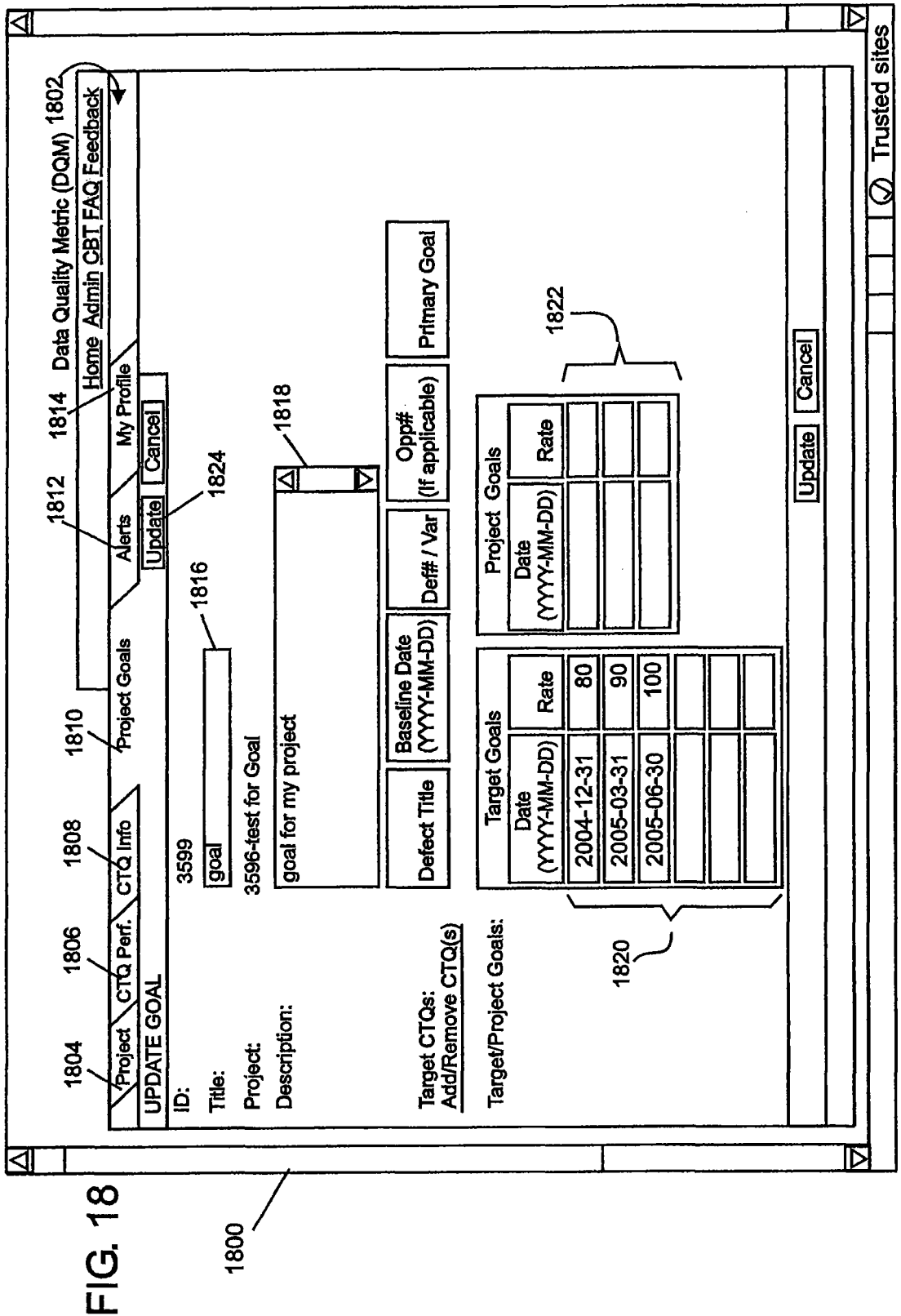
FIG. 18 is an example of a web page, GUI or the like in a data quality management system to update a project goal in accordance with an embodiment of the present invention.

FIG. 18 is an example of a web page, GUI 1800 or the like in a data quality management system to update a project goal in accordance with an embodiment of the present invention. The GUI 1800 may be presented to a user in response to the user clicking-on or activating a project goal link 1618 in GUI 1600 (FIG. 16). The GUI 1800 may include a "Title" field 1816, a "Description" field 1818, "Target Goals" fields 1820 and "Project Goals" fields 1822. Other fields may be provided as appropriate to specify any project goals. The information entered in the fields in GUI 1800 may be updated by the data quality management system in response to clicking-on or activating an "Update" button 1824

Figure 19:
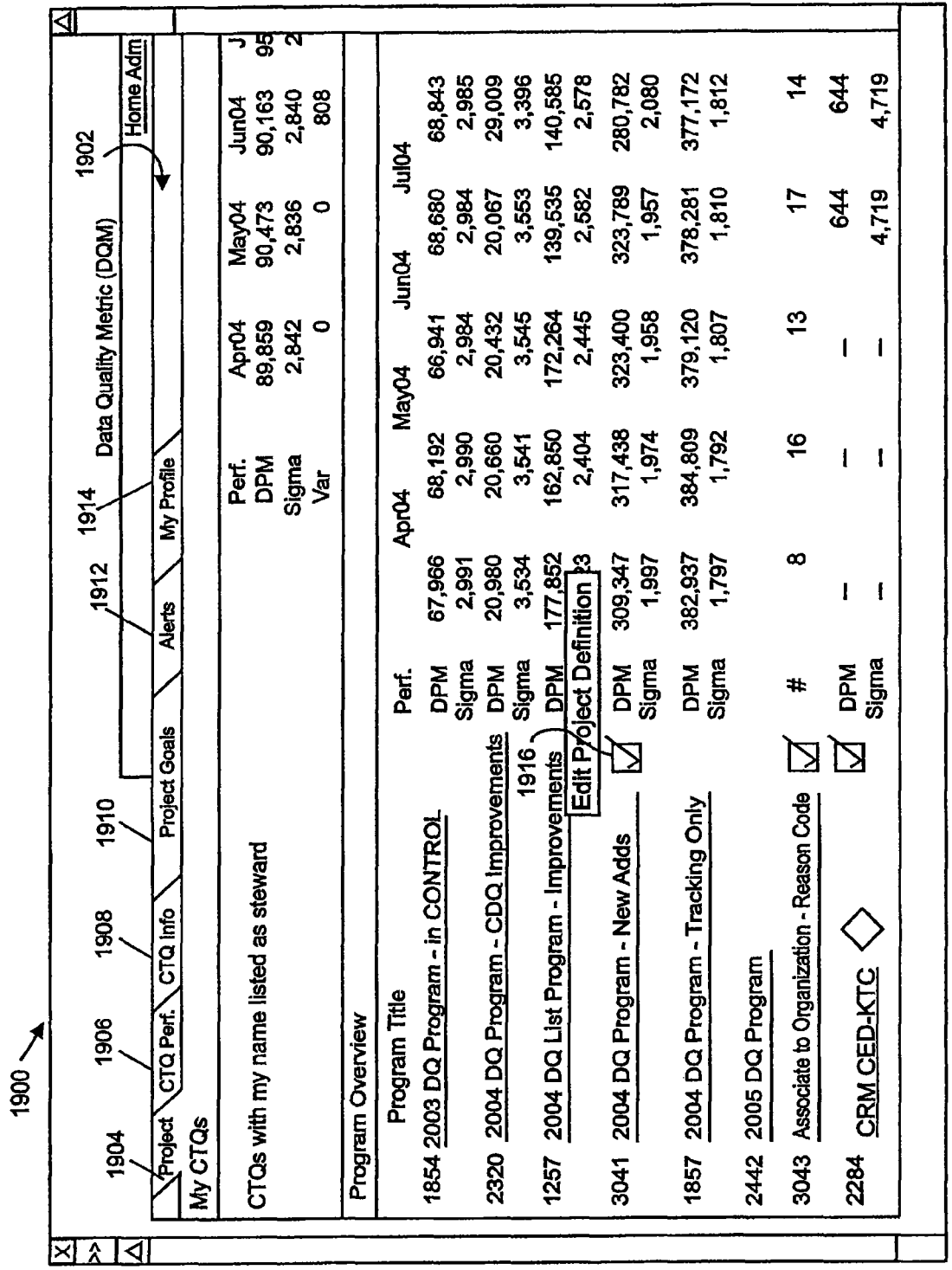
FIG. 19 is an example of a web page, GUI or the like in a data quality management system to select a project for editing a project definition in accordance with an embodiment of the present invention.

FIG. 19 is an example of a web page, GUI 1900 or the like in a data quality management system to select a project for editing a project definition in accordance with an embodiment of the present invention. The GUI 1900 may be same as GUI 800 (FIG. 8) and may be presented to a user in response to the user clicking-on or operating a "Project" tab 1902 or similar "Project" tab in other GUIs illustrated in the Figures. The user may then edit a project definition by clicking-on or activating an edit icon 1916 or the like associated with a project. The edit icon 1916 may be a symbol that connotes an editing function.

Figure 20:
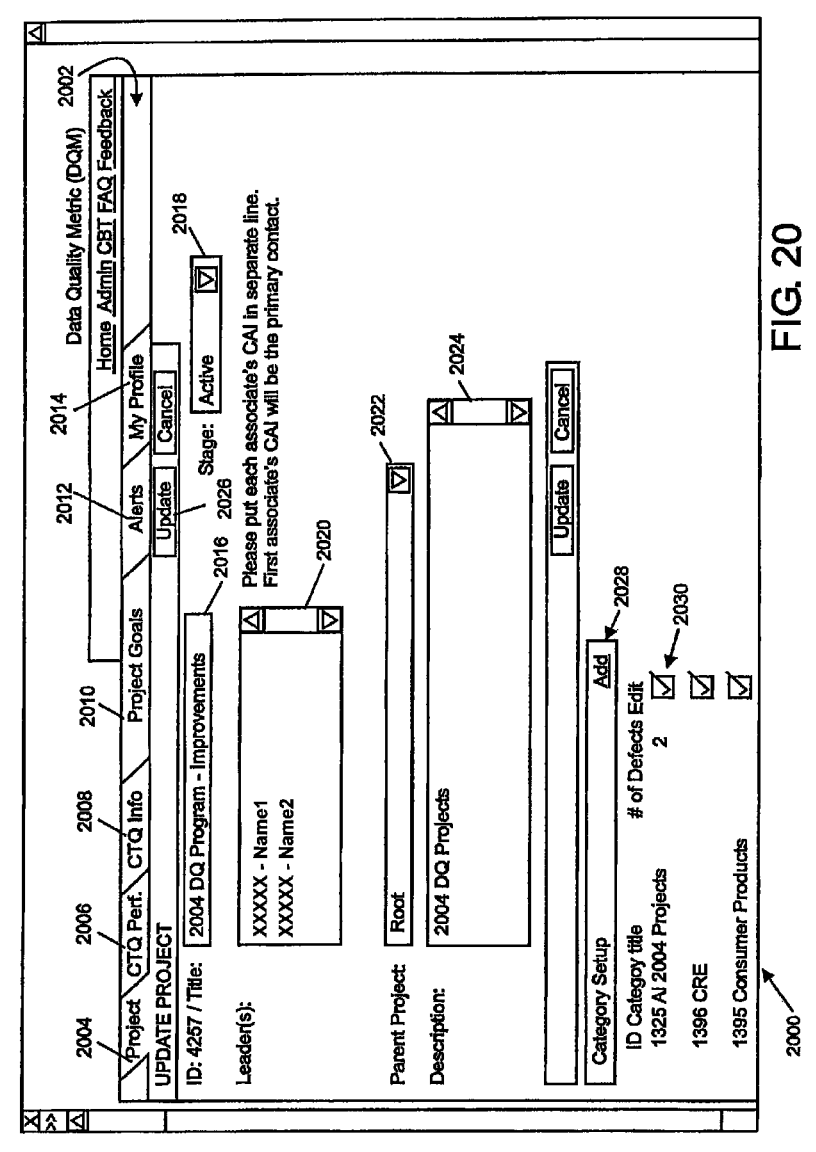

FIG. 20 is an example of a web page, GUI 2000 or the like in a data quality management system to update or edit a project in accordance with an embodiment of the present invention. The GUI 2000 may be presented to a user in response to the user clicking-on the edit icon 1916 in GUI 1900 (FIG. 19). The GUI 2000 may include a "Title" field 2016 to enter a project title. The GUI 2000 may also include a "Stage" field 2018 to enter a stage at which the project may be. The GUI 2000 may further include a "Leaders" field 2020 to identify project leaders, a "Parent Project" field 2022 to enter or select any parent project and a "Description" field 2024 to enter or edit a description of the project. The project information entered or edited in the GUI 2000 may be updated by the system in response to the user operating an "Update" button 2026.

Figure 21:
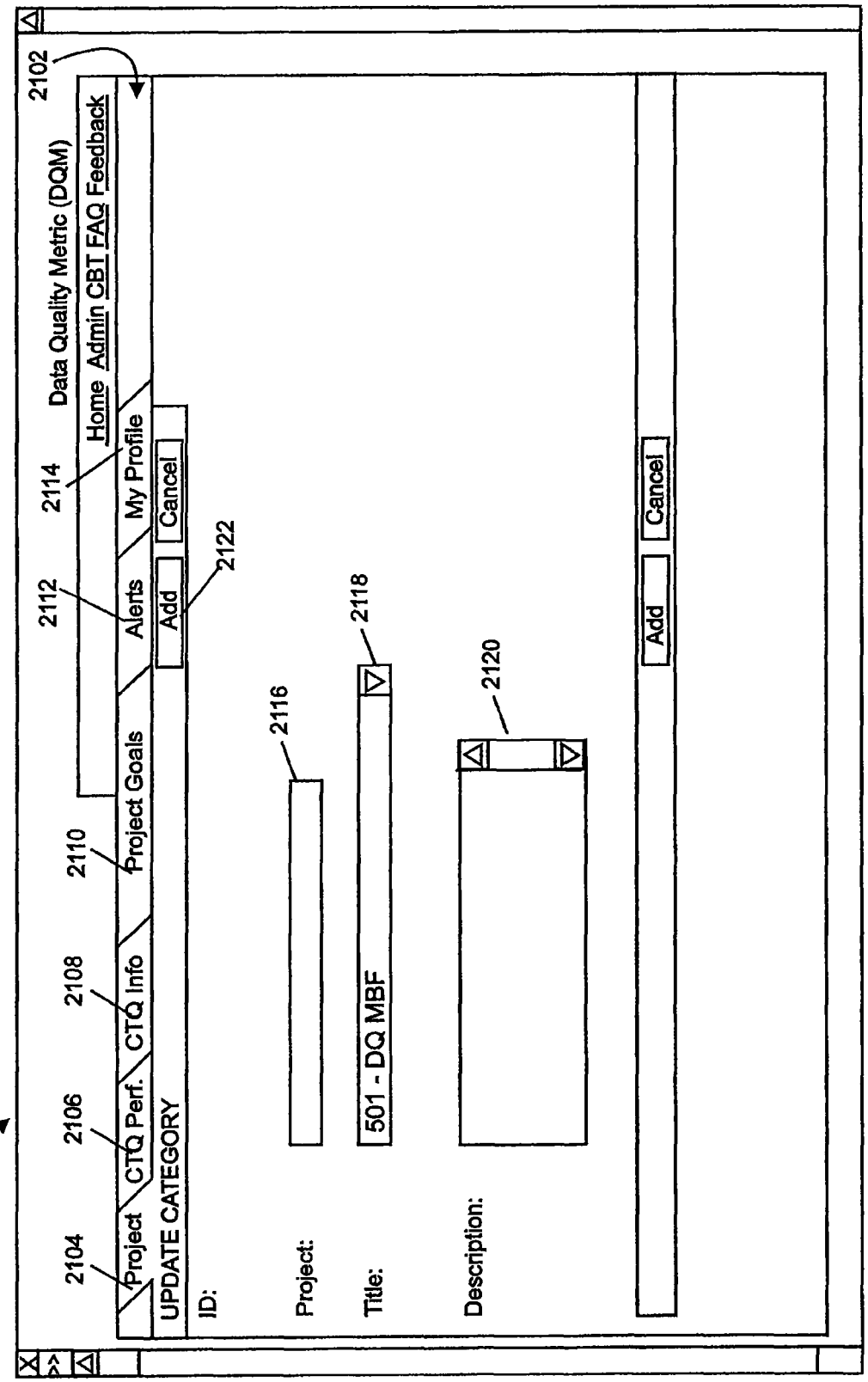
FIG. 21 is an example of a web page, GUI or the like in a data quality management system to add or update a category in a project definition in accordance with an embodiment of the present invention.

FIG. 21 is an example of a web page, GUI 2100 or the like in a data quality management system to add or update a category in a project definition in accordance with an embodiment of the present invention. The GUI 2100 may be presented to a user in response to the user clicking-on an "Add" link in GUI 2000 (FIG. 20) to add a new project category or in response to the user clicking-on an edit icon 2030 in GUI 2000. The GUI 2100 may include a "Title" field 2116 to enter or edit a title for the project category, a "Project" field 2118 to enter or edit a project designation, and a "Description" field 2120 to enter or edit a description of the project category. The new project category information entered in GUI 2100 may be added to the system in response to the user clicking-on or operating an "Add" button 2122.

If the edit icon 2030 was activated in GUI 2000 (FIG. 2) an Update GUI (not shown in the drawings) may be presented to the user. This Update GUI may be the same as GUI 2100 except the button 2122 may be labeled "Update" rather than "Add" in GUI 2100.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for data quality management, comprising:
a processor; and
a query storage, scheduling and execution module to send a query to a source database to collect trend data associated with a characteristic of an element associated with a project, the query storage, scheduling and execution module comprising a graphical user interface (GUI), the GUI comprises:
  a database selection section configured to allow a user to select a source database to query;
  a defect selection section configured to receive a query relating to a number of defects of a project from a user, wherein the results of the query relating to the number of defects of the project is a determination of the number of defects associated with the project from the source database, wherein the defect section is further configured to allow the user to define a defect that will determine an amount of defects of a project from the source database;
  an opportunity selection section configured to allow the user to enter or define an opportunity query that will determine from the source database an amount of opportunities to make a defect;
  a query section configured to receive input from the user relating to scheduling when the defect and opportunity queries are to be executed;
  a project program overview section configured to display a number of projects associated with at least one data steward, a number of data stewards associated with or assigned to each project, and a percent of projects without an associated or assigned data steward;
  a project update section configured to:
    collect data on a predefined time schedule, wherein data is associated with a project; and
    determine an indication of a trend based on at least the data collected, wherein determining an indication of a trend is based on at least comparing the data collected with a predefined project goal; and
  a control section configured to:
    define a control plan to execute a control process at least in response to the indication of a trend towards meeting the predefined project goal;
    generate one or more management reports based on the execution of the control process;

validate the effectiveness of the control process based on the one or more management reports; and determine whether the control plan is effective based on at least the one or more management reports;

when the control plan is effective, implement improvement methods to achieve the predefined project goal at a faster rate; and when the control plan is ineffective, redefine the control plan.

2. The system of claim 1, further comprising a data structure to generate a predetermined representation based on a comparison of the trend data and a project goal.

3. The system of claim 2, wherein the processor is configured to implement an improvement related to the project in response to the representation of the data indicating a trend toward not meeting a predefined project goal.

4. The system of claim 3, wherein the processor is configured to define a control plan in response to the data indicating a trend being out of control.

5. The system of claim 1, wherein defining a defect query comprises entering computer code.

6. The system of claim 1, wherein defining the opportunity query comprises entering computer code.

7. The system of claim 1, wherein the computer code comprises SQL language.

8. The system of claim 1, further comprising system manages multiple projects, each project comprises multiple characteristics, each characteristic comprises defects and opportunities.

9. The system of claim 1, further comprising:
a data entry module to define at least one element associated with the project and to defining one or more measurable characteristics for each element; and
a control chart module to generate a control chart for each characteristic from the collected data related to each characteristic.

10. The system of claim 1, further comprising a run chart module to generate a run chart based on a comparison of the collected trend data to the predefined project goal.

11. The system of claim 1, further comprising a management reports module to generate a management report related to a control process associated with the control plan.

12. The system of claim 1, further comprising an alert definition and detection agent to detect a measurable characteristic associated with an element of the project being out of control.

13. The system of claim 1, further comprising:
a personalized reports and alerts module operable on the processor;
an administration and customer report module operable on the processor;
a personalized e-mail generation and delivery agent operable on the processor.

14. A method of data quality management, comprising:
presenting, by a computer, a graphical user interface (GUI) to a user for sending a query to a source database to collect trend data associated with a characteristic of an element associated with a project;
receiving, by the computer, a user selection of a source database to query;
receiving, by the computer, a user-defined defect query that will determine from the source database a number of defects associated with a project;
receiving, by the computer, a user-defined opportunity query that will determine from the source database an amount of opportunities to make a defect;
receiving, by the computer, user input for scheduling when the defect and opportunity queries are to be executed;
sending, by the computer, a scheduled query to the source database to collect trend data associated with a characteristic of an element associated with the project, the scheduled query being based on the user-defined defect query, the user-defined opportunity query and the user-defined scheduling;
displaying, by the computer, a number of projects associated with at least one data steward, a number of data stewards associated with or assigned to each project, and a percent of projects without an associated or assigned data steward;
collecting data on a predefined time schedule, wherein data is associated with the project;
determining, by the computer, an indication of a trend based on at least the data collected, wherein determining an indication of a trend is based on at least comparing the data collected with a predefined project goal;
defining, by the computer, a control plan to execute a control process at least in response to the indication of a trend towards meeting the predefined project goal;
generating, by the computer, one or more management reports based on the execution of the control process;
validating, by the computer, the effectiveness of the control process based on the one or more management reports;
determining, by the computer, whether the control plan is effective based on at least the one or more management reports;
when the control plan is effective, implementing improvement methods to achieve the predefined project goal at a faster rate; and
when the control plan is ineffective, redefining the control plan.

15. The method of claim 14, further comprising:
collecting data via a computer related to a project;
generating via the computer a predetermined representation of the data.

16. The method of claim 15, further comprising implementing via the computer an improvement related to the project in response to the representation of the data indicating a trend toward not meeting the predefined project goal.

17. The method of claim 14, further comprising defining via the computer a control plan in response to the data indicating a trend toward not meeting the predefined project goal.

18. The method of claim 14, further comprising:
defining at least one element associated with a project;
defining one or more measurable characteristics for each element; and
generating a control chart for each characteristic from the collected data related to each characteristic.

19. The method of claim 18, further comprising analyzing any trends related to each characteristic.

20. The method of claim 19, further comprising generating an alert in response to any characteristic being out of control.

21. The method of claim 20, further comprising automatically generating an e-mail to send the alert.

22. The method of claim 21, further comprising generating a management report related to a control process associated with the control plan.

23. The method of claim 22, further comprising revising the control plan in response to the control process not being effective.

24. The method of claim 14, further comprising:
defining at least one element associated with a project;
entering one or more measurable characteristics for each element;

entering a predefined goal for each measurable characteristic;
entering a database query for each characteristic;
entering source data connectivity parameters; and
entering a data collection execution schedule for each characteristic.

25. A non-transitory computer-readable medium having computer readable program code embodied therein for data quality management, the computer readable program code when executed on a computer causes the computer to perform the steps:
presenting a graphical user interface (GUI) to a user for sending a query to a source database to collect trend data associated with a characteristic of an element associated with a project;
receiving a user selection of a source database to query;
receiving a user-defined defect query that will determine from the source database a number of defects associated with a project;
receiving a user-defined opportunity query that will determine from the source database an amount of opportunities to make a defect;
receiving user input for scheduling when the defect and opportunity queries are to be executed;
sending a scheduled query to the source database to collect trend data associated with a characteristic of an element associated with the project, the scheduled query being based on the user-defined defect query, the user-defined opportunity query and the user-defined scheduling;
displaying a number of projects associated with at least one data steward, a number of data stewards associated with or assigned to each project, and a percent of projects without an associated or assigned data steward;
collecting data on a predefined time schedule, wherein data is associated with the project;
determining an indication of a trend based on at least the data collected, wherein determining an indication of a trend is based on at least comparing the data collected with a predefined project goal;
defining a control plan to execute a control process at least in response to the indication of a trend towards meeting the predefined project goal;
generating one or more management reports based on the execution of the control process,
validating the effectiveness of the control process based on the one or more management reports;
determining whether the control plan is effective based on at least the one or more management reports;
when the control plan is effective, implementing improvement methods to achieve the predefined project goal at a faster rate; and
when the control plan is ineffective, redefining the control plan.

26. The non-transitory computer-readable medium of claim 25, further comprising:
collecting data via a computer related to a project;
generating via the computer a predetermined representation of the data.

27. The non-transitory computer-readable medium of claim 26, further comprising implementing an improvement related to the project in response to the representation of the data indicating a trend toward not meeting the predefined project goal.

28. The non-transitory computer-readable medium of claim 27, further comprising defining via the computer a control plan in response to the data indicating a trend toward not meeting the predefined project goal.

29. The non-transitory computer-readable medium of claim 25, further comprising;
defining at least one element associated with a project;
defining one or more measurable characteristics for each element; and
generating a control chart for each characteristic from the collected data related to each characteristic.

30. The non-transitory computer-readable medium of claim 29, further comprising analyzing any trends related to each characteristic.

31. The non-transitory computer-readable medium of claim 30, further comprising generating an alert in response to any characteristic being out of control.

32. The non-transitory computer-readable medium of claim 31, further comprising automatically generating an e-mail to send the alert.

33. The non-transitory computer-readable medium of claim 25, further comprising generating a management report related to a control process associated with the control plan.

34. The non-transitory computer-readable medium of claim 25, further comprising generating a run chart based on comparing the collected trend data to the predefined project goal.

* * * * *